United States Patent
Nussbaum et al.

(10) Patent No.: US 11,922,618 B2
(45) Date of Patent: Mar. 5, 2024

(54) GUIDED VEHICLE CAPTURE FOR VIRTUAL MODEL GENERATION

(71) Applicant: State Farm Mutual Automobile Insurance Company, Bloomington, IL (US)

(72) Inventors: Bryan R. Nussbaum, Bloomington, IL (US); Rebecca A. Little, Mesa, AZ (US); Kevin L Mitchell, Tempe, AZ (US); Nathan C. Summers, Mesa, AZ (US); An Ho, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 32 days.

(21) Appl. No.: 17/728,092

(22) Filed: Apr. 25, 2022

(65) Prior Publication Data
US 2022/0245781 A1 Aug. 4, 2022

Related U.S. Application Data

(63) Continuation of application No. 16/879,607, filed on May 20, 2020, now Pat. No. 11,315,239, which is a continuation of application No. 15/820,519, filed on Nov. 22, 2017, now Pat. No. 10,699,404.

(51) Int. Cl.
*G06T 7/00* (2017.01)
*G06Q 40/08* (2012.01)

(52) U.S. Cl.
CPC ............ *G06T 7/001* (2013.01); *G06Q 40/08* (2013.01); *G06T 2207/10028* (2013.01); *G06T 2207/30252* (2013.01)

(58) Field of Classification Search
CPC .......... G06T 7/001; G06T 2207/10028; G06T 2207/30252; G06T 2200/08; G06T 7/50; G06Q 40/08
See application file for complete search history.

(56) References Cited

U.S. PATENT DOCUMENTS

| | | | |
|---|---|---|---|
| 8,756,085 B1 | 6/2014 | Plummer et al. | |
| 9,311,271 B2 | 4/2016 | Wright | |
| 9,633,487 B2 | 4/2017 | Wright | |
| 9,721,302 B2 * | 8/2017 | Tofte | G06Q 40/08 |

(Continued)

OTHER PUBLICATIONS

Office Action for U.S. Appl. No. 16/879,607, dated Sep. 13, 2021. Nussbaum, "Guided Vehicle Capture for Virtual Mode Generation", 9 Pages.

*Primary Examiner* — Wesley J Tucker
(74) *Attorney, Agent, or Firm* — Lee & Hayes, P.C.

(57) ABSTRACT

Methods and system for guiding user data capture during a scan of a vehicle using a mobile device are disclosed. A user may scan a vehicle using a camera or other sensors of the mobile device to capture data from which a three-dimensional virtual model may be generated. During the scanning process, models may be generated and evaluated according to quality metrics. Visual cues may be determined and presented to the user during scanning to indicate areas sufficiently scanned or areas requiring additional scanning to meet data quality requirements for model generation. Damage to vehicle components may be identified by analysis of the generated model, and addition data capture or user annotation entry may be directed based upon the identified damage.

20 Claims, 10 Drawing Sheets

(56) References Cited

U.S. PATENT DOCUMENTS

| | | |
|---|---|---|
| 9,721,304 B1 | 8/2017 | Parchment et al. |
| 9,886,771 B1 | 2/2018 | Chen et al. |
| 10,091,490 B2 | 10/2018 | Sharma et al. |
| 10,192,369 B2 | 1/2019 | Wright |
| 10,198,879 B2 | 2/2019 | Wright |
| 10,217,168 B2 * | 2/2019 | Tofte ............... G06Q 10/06 |
| 10,319,094 B1 * | 6/2019 | Chen ................ G06N 3/08 |
| 10,699,404 B1 | 6/2020 | Nussbaum et al. |
| 10,950,033 B2 * | 3/2021 | Holzer ............ G01N 21/9515 |
| 10,991,051 B2 * | 4/2021 | Cook ............... G06Q 40/08 |
| 11,367,257 B2 * | 6/2022 | Kaino ............... G06T 7/50 |
| 11,625,791 B1 * | 4/2023 | Brandmaier ........ G06Q 40/08 705/4 |
| 11,663,799 B1 * | 5/2023 | Bagheri ............. G06N 20/00 382/159 |
| 2009/0138290 A1 | 5/2009 | Holden |
| 2011/0218825 A1 | 9/2011 | Hertenstein |
| 2012/0076437 A1 | 3/2012 | King |
| 2014/0288976 A1 * | 9/2014 | Thomas ............. G06Q 40/08 345/443 |
| 2015/0279121 A1 | 10/2015 | Myers et al. |
| 2017/0148102 A1 | 5/2017 | Franke et al. |
| 2017/0251143 A1 * | 8/2017 | Peruch ............. H04N 13/239 |
| 2017/0293894 A1 * | 10/2017 | Taliwal ............. G06V 10/82 |
| 2018/0260793 A1 | 9/2018 | Li et al. |
| 2019/0196680 A1 * | 6/2019 | Park ................ G06V 10/255 |
| 2020/0398777 A1 * | 12/2020 | Brozovich ......... G07C 5/008 |
| 2022/0301071 A1 * | 9/2022 | Kelsh .............. G06Q 30/0283 |
| 2022/0309644 A1 * | 9/2022 | Shi ................ G05D 1/0212 |

\* cited by examiner

GUIDED VEHICLE CAPTURE FOR VIRTUAL MODEL GENERATION

CROSS-REFERENCE TO RELATED APPLICATIONS

This application is a continuation of, and claims priority to, U.S. patent application Ser. No. 16/879,607, filed on May 20, 2020, which is a continuation of, and claims priority to, U.S. patent application Ser. No. 15/820,519, filed on Nov. 22, 2017, now U.S. Pat. No. 10,699,404, issued Jun. 30, 2020, entitled "GUIDED VEHICLE CAPTURE FOR VIRTUAL MODE GENERATION", the entire disclosures of which are fully incorporated by reference herein.

TECHNICAL FIELD

The present disclosure generally relates to methods and systems for guiding a user during three-dimensional (3-D) scanning of a vehicle to improve virtual model quality.

BACKGROUND

Under appropriate circumstances, damage to a vehicle or other object can be estimated from a 3-D virtual model. Such estimation techniques are particularly useful where physical access to the vehicle or other object is difficult, dangerous, or time-consuming. However, the estimates of damage are limited by the quality of the virtual model, which is limited by the quality of captured data from which the virtual model is generated. Existing techniques rely upon a trained technician or other individual to perform high-quality data capture (i.e., scanning).

SUMMARY

The present disclosure generally relates to systems, methods, and computer-readable media storing instructions for guiding a user to capture data for virtual model generation. Directions or instructions may be presented to a user of via a computing device to guide the user through scanning a vehicle or other object by controlling sensors of the computing device to capture data regarding the vehicle or other object. As an example, instructions to position or move a mobile computing device around a portion of a vehicle may be presented to the user of the mobile computing device. The quality of captured data or virtual models derived therefrom may also be evaluated to determine whether the captured data from the scanning performed by the user is of sufficient quality for model generation or analysis. Damage to vehicle components or other objects may be automatically identified based upon the virtual models, in some embodiments. Various aspect of example techniques are summarized below, which may include additional, less, or alternate actions, including those discussed elsewhere herein.

In one aspect, a computer-implemented method for guiding a user to capture data for virtual model generation may be provided. The method may include receiving an indication from the user of a vehicle to model, presenting an instruction to the user to capture data points associated with a portion of the vehicle, capturing a plurality of data points indicating positions on a surface of the portion of the vehicle, generating a virtual model of the portion of the vehicle in a three-dimensional virtual space based upon the plurality of data points, presenting a visual representation of the virtual model to the user, determining completion of data capture for the portion of the vehicle, and/or storing the virtual model. Information and/or indications may be received and/or presented via a mobile device (i.e., a mobile computing device) associated with the user, and the data points may be captured using one or more sensors of the mobile device.

The visual representation may indicate one or more of the following: (i) areas of the surface of the vehicle for which sufficient data points for model generation have been captured or (ii) areas of the surface of the vehicle for which sufficient data points for model generation have not been captured. In some embodiments, visual cues may be used to present instructions to the user. Presenting the instruction to the user to capture data points associated with the portion of the vehicle may include presenting to the user a plurality of visual cues indicating areas of the portion of the vehicle to capture. Capturing the plurality of data points associated with the portion of the vehicle may include receiving user indications of completion of data capture corresponding to the plurality of visual cues. Determining completion of data capture for the portion of the vehicle may include determining the user indications of completion have been received for all of the plurality of visual cues.

Determining completion of data capture for the portion of the vehicle may include generating a quality metric of the virtual model and determining the quality metric meets a corresponding quality threshold. Such quality metric may include an estimate of error for at least a section of the virtual model based upon the plurality of data points. Additionally or alternatively, determining completion of data capture for the portion of the vehicle may include receiving a completion indication from the user. When such a completion indication is received, information regarding the virtual model of the portion of the vehicle may be presented to the user. The completion of data capture for the portion of the vehicle may be determined based upon a user response to the information presented.

In some embodiments, the method may include presenting a plurality of scanning options associated with vehicle components to the user. In such embodiments, receiving the indication from the user may include a selection by the user of one of the plurality of scanning options associated with the portion of the vehicle.

In further embodiments, the method may further include actions to rescan or recapture a portion of the vehicle to obtain adequate quality data for model generation and/or evaluation. The method may include identifying a section of the portion of the vehicle to be recaptured and presenting an additional instruction to the user to capture additional data points associated with the section. The method may further include updating or replacing the virtual model based upon the additional data points.

In yet further embodiments, the methods may include receiving a user annotation associated with the portion of the vehicle, which user annotation may include an indication of a location within the virtual model. Such annotation or information associated therewith may be transmitted to a server for further processing, including use in insurance claim processing. The annotation may be associated with a component of the vehicle based upon a location associated with the annotation in the virtual model. Such component of the vehicle may be identified as damaged, based upon the annotation or based upon analysis of the virtual model. A damage estimate may further be determined for insurance claim processing based upon the user annotation and/or identified component of the vehicle.

In embodiments in which the damaged vehicle component is identified by analysis of the virtual model, the method may include identifying one or more abnormalities within the virtual model and determining a damaged section of the portion of the vehicle based upon the one or more abnormalities. The one or more abnormalities may be identified based upon computational geometric analysis of one or more virtual surfaces of the virtual model. When a damaged vehicle component is thus identified, a prompt to enter a user annotation associated with the damaged section may be presented to the user. A user annotation may be entered by the user, and the component of the vehicle associated with the damaged section may be identified. A damage estimate may further be determined based upon the user annotation and/or the component of the vehicle for insurance claim processing.

In another aspect, a computer system for guiding a user to capture data for virtual model generation may be provided. The computer system may include one or more processors, one or more sensors communicatively connected to the one or more processors, a display communicatively connected to the one or more processors; and/or a non-transitory program memory communicatively coupled to the one or more processors and storing executable instructions. The executable instructions, when executed by the one or more processors, may cause the computer system to: receive an indication from the user of a vehicle to model, present an instruction to the user to capture data points associated with a portion of the vehicle via the display, capture a plurality of data points indicating positions on a surface of the portion of the vehicle using the one or more sensors, generate a virtual model of the portion of the vehicle in a three-dimensional virtual space based upon the plurality of data points, present a visual representation of the virtual model to the user via the display, determine completion of data capture for the portion of the vehicle, and/or store the virtual model in the non-transitory program memory. The visual representation may indicate one or more of the following: (i) areas of the surface of the vehicle for which sufficient data points for model generation have been captured or (ii) areas of the surface of the vehicle for which sufficient data points for model generation have not been captured. The computer system may be a mobile computing device, and the one or more sensors may include one or more cameras of the mobile computing device.

In yet another aspect, a tangible, non-transitory computer-readable medium storing executable instructions for guiding a user to capture data for virtual model generation may be provided. The tangible, non-transitory computer-readable medium may include instructions executable by at least one processor of a computer system that, when executed by the at least one processor of the computer system, cause the at least one processor to receive an indication from the user of a vehicle to model, present an instruction to the user to capture data points associated with a portion of the vehicle via a display, capture a plurality of data points indicating positions on a surface of the portion of the vehicle using the one or more sensors, generate a virtual model of the portion of the vehicle in a three-dimensional virtual space based upon the plurality of data points, present a visual representation of the virtual model to the user via the display, determine completion of data capture for the portion of the vehicle, and/or store the virtual model in the non-transitory program memory. The visual representation may indicate one or more of the following: (i) areas of the surface of the vehicle for which sufficient data points for model generation have been captured or (ii) areas of the surface of the vehicle for which sufficient data points for model generation have not been captured.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

DETAILED DESCRIPTION

Described herein are systems, methods, and user interfaces configured to guide a user in capturing data regarding a vehicle or other object to generate a three-dimensional (3-D) virtual model of the vehicle or object. Such virtual models can be used to identify and assess damage to vehicles, but the ability to identify damage is limited by the accuracy and completeness of the model. The accuracy and completeness of the model (i.e., the quality of the model) is further limited by the quality of the data from which the model is generated. Because 3-D virtual models represent physical objects in a virtual space within a computer system, a user cannot readily access the data representing the virtual model, nor can a user readily determine whether the captured data is sufficient for generating a high-quality virtual model. The techniques described herein solve the problem of ensuring adequate data capture quality by the user by guiding the user through data capture based upon evaluated data quality during data capture, which may include presenting visual indications of captured data quality to the user during data capture. Presenting such visual indications to the user enables the user to identify areas needing to be recaptured (i.e., rescanned) in order to obtain a virtual model of sufficient quality for further analysis. In some embodiments, express instructions to rescan a part of the vehicle may be presented to the user during data capture to improve the quality of data captured.

System Overview

Figure 1:
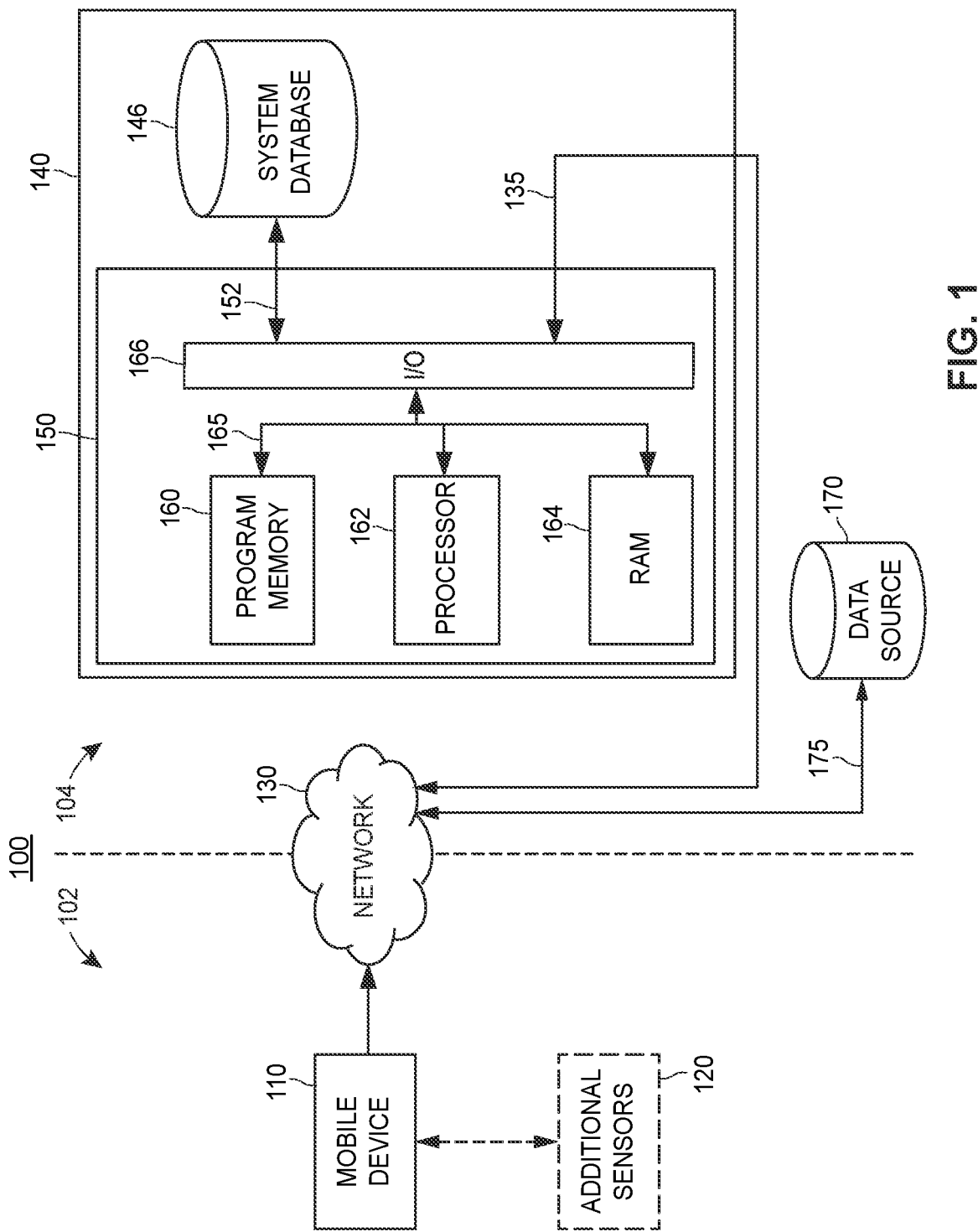
FIG. 1 illustrates a block diagram of an exemplary virtual vehicle modeling system on which the methods described herein may operate in accordance with the described embodiments.

FIG. 1 illustrates a block diagram of an exemplary virtual vehicle modeling system 100. The high-level architecture includes both hardware and software applications, as well as various data communications channels for communicating data between the various hardware and software components. The virtual vehicle modeling system 100 may be roughly divided into front-end components 102 and back-end components 104. The front-end components 102 are configured to enable a user to scan a vehicle and interact with a virtual representation of the vehicle via a mobile computing device 110, which may include or be connected to additional sensors 120 for capturing data regarding the vehicle. The front-end components 102 may communicate with the back-end components 104 via a network 130, which is configured to communicate electronic data between the front-end components 102 and the back-end components 104. The back-end components 104 may include one or more servers 140 that may communicate with the front-end components 102 and/or data sources 170 via the network 130. The servers 140 may perform data processing and/or provide information based upon information received from the front-end components 102, as described further herein. The one or more data sources 170 may be connected to the front-end components 102 or to the servers 140 to provide information for virtual model generation and/or damage assessment via link 175 with the network 130. Such data sources 170 may include databases of costs for repairing or replacing damaged vehicle components. In alternative embodiments, the virtual vehicle modeling system 100 may consist of only the front-end components 102, without necessarily connecting to the back-end components 104 via a network 130.

The front-end components 102 may be disposed within one or more mobile computing devices 110, which may include a desktop computer, notebook computer, netbook computer, tablet computer, or mobile device (e.g., smart phone, wearable computer, computer headset, etc.). In a preferred embodiment, the mobile computing device 110 may be a general use smartphone or tablet computer with at least one image capture device (e.g., a digital camera) and a touchscreen display. In some embodiments, the mobile computing device 110 may be a thin-client device, wherein much or all of the computing processes are performed by the server 140, with information communicated between the thin-client mobile computing device 110 and the server 140 via the network 130.

The mobile computing device 110 may include internal sensors and, in some embodiments, may be further communicatively connected to one or more additional external sensors 120 by any known wired or wireless means (e.g., USB cables, Bluetooth communication, etc.). The one or more additional sensors 120 may comprise an array of sensors and/or cameras, which detect different frequencies or ranges of frequencies of the electromagnetic spectrum (e.g., visible, infrared, ultraviolet, x-ray, etc.). The internal sensors 108 (described below) or the additional sensors 120 connected to the mobile computing device 110 may include stereoscopic cameras, infrared ranging units, or other components configured to detect a detect a distance of a point from the mobile computing device 110 or a position of the point in three-dimensional space, relative to the mobile computing device 110. In further embodiments, one or more of the additional sensors 120 may utilize a fisheye lens in which wide panoramic or hemispherical images may be generated. Further, other types of additional sensors may be used such as LIDAR, RADAR, and SONAR, for example. Still further, an illumination component (e.g., an LED flash) may accompany the additional sensors. The mobile computing device 110 is further discussed below with respect to FIG. 2.

In some embodiments, the front-end components 102 may communicate with the back-end components 104 via the network 130. Communication between the front-end components 102 and back-end components 104 may include transmission and receipt of electronic signals encoding computer-readable information in one or more messages, which may be received and routed by various components of the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130 by a link 135. Each server 140 may include one or more processors 162 adapted and configured to execute various software applications and components of the system 100, in addition to other software applications. The server 140 may further include a database 146, which may be adapted to store data related to the system 100, such as data points or virtual models, cost data associated with corresponding vehicle components or repairs, or similar data. The server 140 may access data stored in the database 146. The server 140 may have a controller 150 that is operatively connected to the database 146. It should be noted that, while not shown, additional databases may be linked to the controller 150 in any known manner. The controller 150 may include a program memory 160 for storing non-transitory computer-readable instructions in a tangible medium, a processor 162 for executing computer-readable instructions, a RAM 164 providing volatile data storage, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example.

The server 140 may further include a number of software applications or routines stored in a program memory 160. In some embodiments, these applications or routines may form modules when implemented by the processor 162, which modules may implement part or all of the methods described below to generate or interact with user interfaces of the mobile computing device 110 or to generate vehicle damage assessment data based upon information from the mobile computing device 110. In some embodiments, such modules may include one or more of a configuration module, an analysis module, or a response module. In further embodiments, the various software applications may include a web server application responsible for generating data content to be included in web pages, including web pages sent from the server 140 to the mobile computing device 110 or to other computing devices for storage or review.

The back-end components 104 may further include one or more data sources 170, communicatively connected to the network 130 via link 175. The data sources 170 may include public or proprietary databases storing information that may be associated with a user of the mobile computing device 110, virtual baseline models of different vehicles, average costs for repairing vehicle components, average costs for replacing vehicle components, or other data related to vehicle damage assessment. Additionally, or alternatively, the data sources 170 may include databases maintained by another entity, such as a manufacturer or reseller of vehicles and vehicle parts. In some embodiments, the data source 170 may further execute software programs or applications, such as a web server. For example, the data source 170 may include a third-party server configured to generate a 3-D virtual model based upon captured data or configured to identify objects within images (e.g., a vehicle component, such as a bumper or mirror), such as a reverse image search service.

Figure 2:
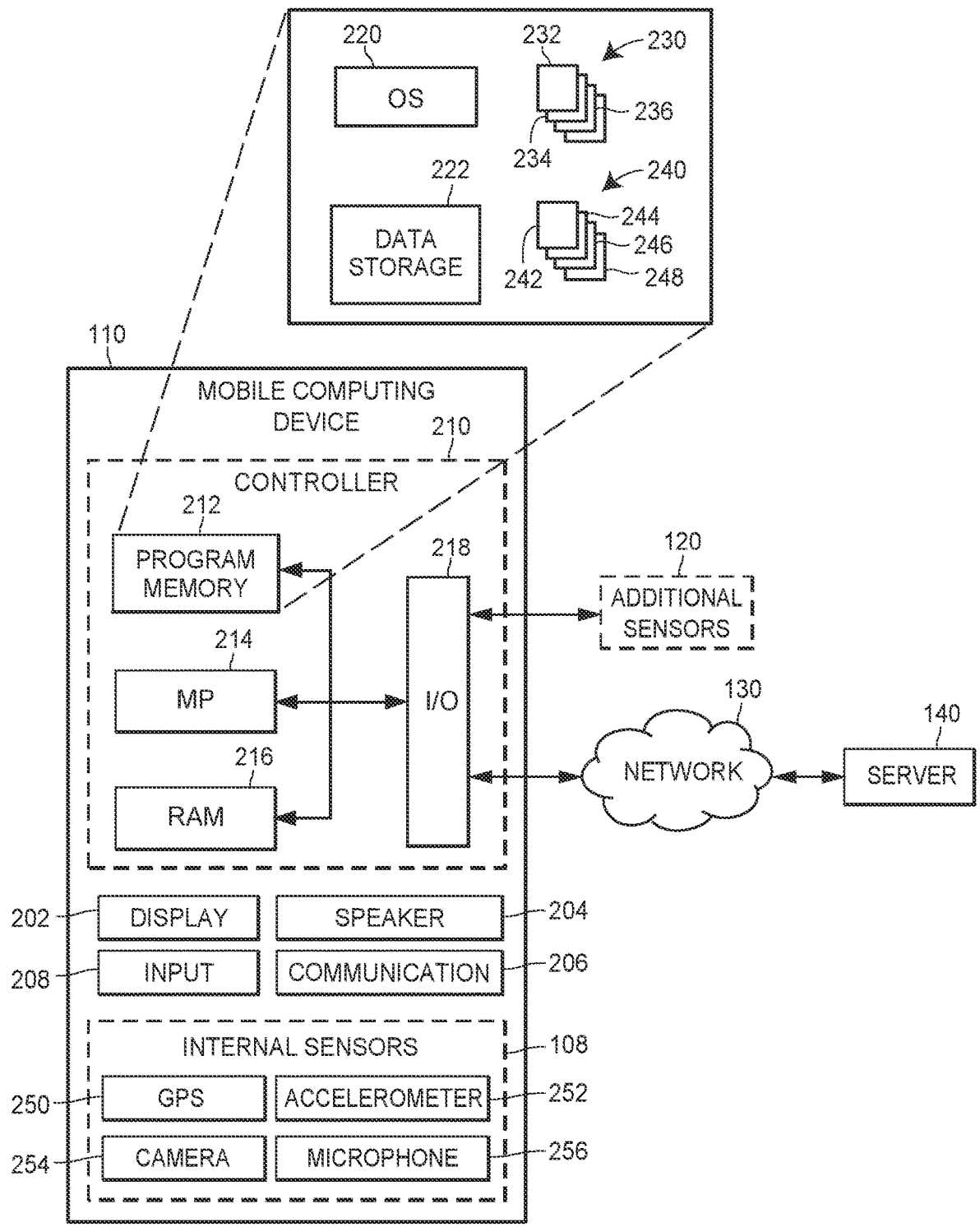
FIG. 2 illustrates a block diagram of an exemplary mobile computing device for use in data capture and virtual vehicle modeling, in accordance with the embodiments described herein.

FIG. 2 illustrates a block diagram of an exemplary mobile computing device 110 in accordance with the virtual vehicle modeling system 100. Such mobile computing device 110 may be a smartphone, a tablet computer, or similar mobile device capable of receiving and processing electronic information. The mobile computing device 110 may include one or more internal sensors 108, which may provide sensor data regarding a local physical environment in which the mobile computing device 110 is operating. Such sensor data may include 2-D or 3-D images of a vehicle or portions thereof, which may be captured by one or more cameras 254 of the mobile computing device 110. Additionally, in some embodiments, the mobile computing device 110 may receive sensor data from one or more additional sensors 120. The sensor data may be processed by the controller 210 to generate and/or display a virtual model of a vehicle for user interaction, as discussed elsewhere herein. Additionally, or alternatively, the sensor data may be sent to one or more processors 162 of the server 140 through the network 130 for processing.

When the controller 210 (or other processor) generates the virtual model of a vehicle, a representation of the virtual model of the vehicle may be presented to the user of the mobile computing device 110 using a display 202 or other output component of the mobile computing device 110. A representation of the virtual model or of a partial virtual model may similarly be presented to the user via the display 202 during data capture (i.e., while the user is scanning the vehicle using the mobile computing device 110 to capture data from which to generate the virtual model). In some embodiments, such representation may be presented using indicators of captured portions of a vehicle (e.g., vertices, edges, or polygons indicating a partial model of the vehicle using the captured data), which may be presented to the user via the display 202 in real time while the user scans the vehicle (i.e., captures data by movement of the mobile computing device 110 within the vehicle environment to obtain data points using the internal sensors 108 and/or additional sensors 120). In further embodiments, instructions for capturing data for model generation may likewise be presented to the user via the display 202. User input may likewise be received via an input 208 of the mobile computing device 110. Thus, the mobile computing device 110 may include various input and output components, units, or devices.

The display 202 and speaker 204, along with other integrated or communicatively connected output devices (not shown), may be used to present information to the user of the mobile computing device 110 or others. The display 202 may include any known or hereafter developed visual or tactile display technology, including LCD, OLED, AMO-LED, projection displays, refreshable braille displays, haptic displays, or other types of displays. The one or more speakers 206 may similarly include any controllable audible output device or component, which may include a haptic component or device. In some embodiments, communicatively connected speakers 206 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include internal sensors 108. The internal sensors 108 may include any devices or components mentioned herein, other extant devices suitable for capturing data regarding a physical environment, or later-developed devices that may be configured to provide data regarding a physical environment (including components of vehicles, structures, or other objects within the physical environment). The internal sensors 108 of the mobile computing device 110 may be supplemented by additional sensors 120, in some embodiments, which may be physically and/or communicatively connected to the mobile computing device 110 to provide additional data to the mobile computing device 110. Some additional sensors 120 may be configured or intended for other uses, such as geolocation, movement tracking, photography, spatial orientation of the device, and capturing scans for the generation of virtual vehicle model. Such additional sensors 120 may, nonetheless, be used to provide sensor data for capturing data regarding the vehicle to generate a corresponding virtual vehicle, as discussed herein. As an example, the additional sensors 120 may include one or more additional cameras to enable three-dimensional stereoscopic data capture for depth perception (i.e., for automatically determining the distance of one or more points from the mobile computing device 110).

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a camera 254, or a microphone 256. Any or all of these may be used to generate sensor data used in generating a virtual representation of the physical environment or items therein, such as a vehicle in proximity to the mobile computing device 110. Additionally, other types of currently available or later-developed sensors may be included in some embodiments.

The GPS unit 250 and the accelerometer 252 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots. The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes or other types of movement-detecting sensors may be used in various embodiments. Such sensor data may be used to determine a relative position of the mobile computing device 110 within the physical environment. Such relative position information may be combined with other sensor data (such as visual image data from a camera 254) to provide data from which the mobile computing device 110 can generate a virtual model of a vehicle or other object. For example, multiple two-dimensional (2-D) images of the same portion of the vehicle may be compared based upon relative position information to determine the size, distance, and three-dimensional (3-D) shape of parts of the vehicle, based upon differences between the images. Likewise, relative 3-D locations of data points associated with the vehicle may be determined based upon data obtained from one or more sensors (e.g., by triangulation from a plurality of images).

The camera 254 may be used to capture still or video images of the vehicle to be modeled or other objects in the local physical environment of the mobile computing device 110. Such images may be used to generate and utilize virtual vehicle models in order to facilitate vehicle damage or loss assessment. The one or more cameras 254 may include digital cameras or other similar devices, such as charge-coupled devices, to detect electromagnetic radiation in the visible wavelength range or other wavelengths. It will be readily understood that one or more cameras 254 may be disposed within the mobile computing device 110 and configured to generate either still images or video recordings. For example, multiple cameras 254 may be disposed to obtain stereoscopic images of the physical environment, thereby better enabling the mobile computing device 110 to generate virtual space representations of the physical environment. In some embodiments, the camera 254 may include an infrared illuminator or other device to stimulate emission within a targeted range. Such infrared illuminators may be automatically activated when light is insufficient for image capturing. Additional or alternative internal sensors 108 may be included in some embodiments to capture data regarding locations and shapes of objects within the physical environment.

In some embodiments, additional sensors 120 may be communicatively connected to the mobile computing device by any known wired or wireless means (e.g., USB cables, Bluetooth communication, etc.). As discussed above, the one or more additional sensors 120 may consist of an array of sensors and/or cameras, which may detect radiation at one or more wavelengths or ranges of wavelengths of the electromagnetic spectrum (e.g., visible, infrared, ultraviolet, x-ray, etc.). Such sensors and/or cameras may come in the form or charge coupled devices (CCDs), focal plane arrays (FPAs), single element sensors, etc. In some embodiments, one or more of the additional exterior sensors may be designed to detect multiple wavelengths in the same spectrum. Additionally, as discussed above, in some embodiments, one or more of the additional sensors 120 may utilize a fisheye lens in which wide panoramic or hemispherical images may be generated. In some embodiments, a separate sensor and/or camera may be designated for each of a plurality of wavelengths or wavelength ranges, in order to obtain a better dataset from which to generate the virtual model of the vehicle. The additional sensors 120 may also incorporate the functionality of camera 254, as described above.

The microphone 256 may be used to detect sounds within the local physical environment 106, such as spoken notes or comments by the user of the mobile computing device 110. One or more microphones 256 may be disposed within the mobile computing device 110 or may be communicatively connected thereto. For example, wired or wireless microphones 256 may be communicatively connected to the mobile computing device 110, such as wireless speaker/microphone combination devices communicatively paired with the mobile computing device 110.

The mobile computing device 110 may also communicate with the server 140, the data source 170, or other components via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to the server 140 or other devices via the network 130.

The mobile computing device 110 may further include a controller 210. The controller 210 may receive, process, produce, transmit, and store data. The controller 210 may include a program memory 212 for storing non-transitory computer-readable instructions in a tangible medium, one or more microcontrollers or microprocessors (MP) 214 for executing computer-readable instructions, a random access memory (RAM) 216 providing volatile data storage, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAMs 216 or multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memory 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement the virtual vehicle modeling and damage assessment functions described herein. Thus, the software applications 230 may include a virtual vehicle model application 232 to generate a virtual model of a scanned vehicle, a vehicle damage assessment application 234 to determine the extent of damage to the vehicle based upon the virtual model of the vehicle, and a user guidance application 236 to provide instructions to the user for capturing data relating to a vehicle. The software routines 240 may support the software applications 230 and may include routines such as an image capture routine 242 to process image data from the camera 254 and/or additional sensors 120, a virtual vehicle model generation routine 244 for generating a virtual model of a vehicle based on captured scans from at least three different wavelength ranges of the electromagnetic spectrum, a model quality verification routine 246 for determining whether the captured data is of sufficient quantity and quality for virtual model generation, and a vehicle damage assessment routine 248 to identify and determine an extent of damage to the vehicle. It should be understood that additional or alternative applications 230 or routines 240 may be included in the program memory 212, including web browsers or other applications of the sort ordinarily stored on a mobile devices.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch or head-mounted display, either of which may include one or more cameras to capture data regarding the vehicle or other object to be modeled.

The virtual vehicle modeling system 100 described above and illustrated in FIGS. 1-2 may be used to perform the methods discussed further below. Although the following description of exemplary methods discusses aspects of the invention disclosed herein as being performed by the mobile computing device 110 for clarity, it should be understood that part or all of the methods could be performed by any combination of the mobile computing device 110, the server 140, or other devices, in various embodiments. For example, the mobile computing device 110 may be capable of performing all the steps of the methods herein as a stand-alone device, but it may nonetheless be configured in some embodiments to communicate with the server 140 for estimating damage or loss or for preparing or processing insurance claims related to such damage or loss.

Vehicle Scanning

Figure 3:
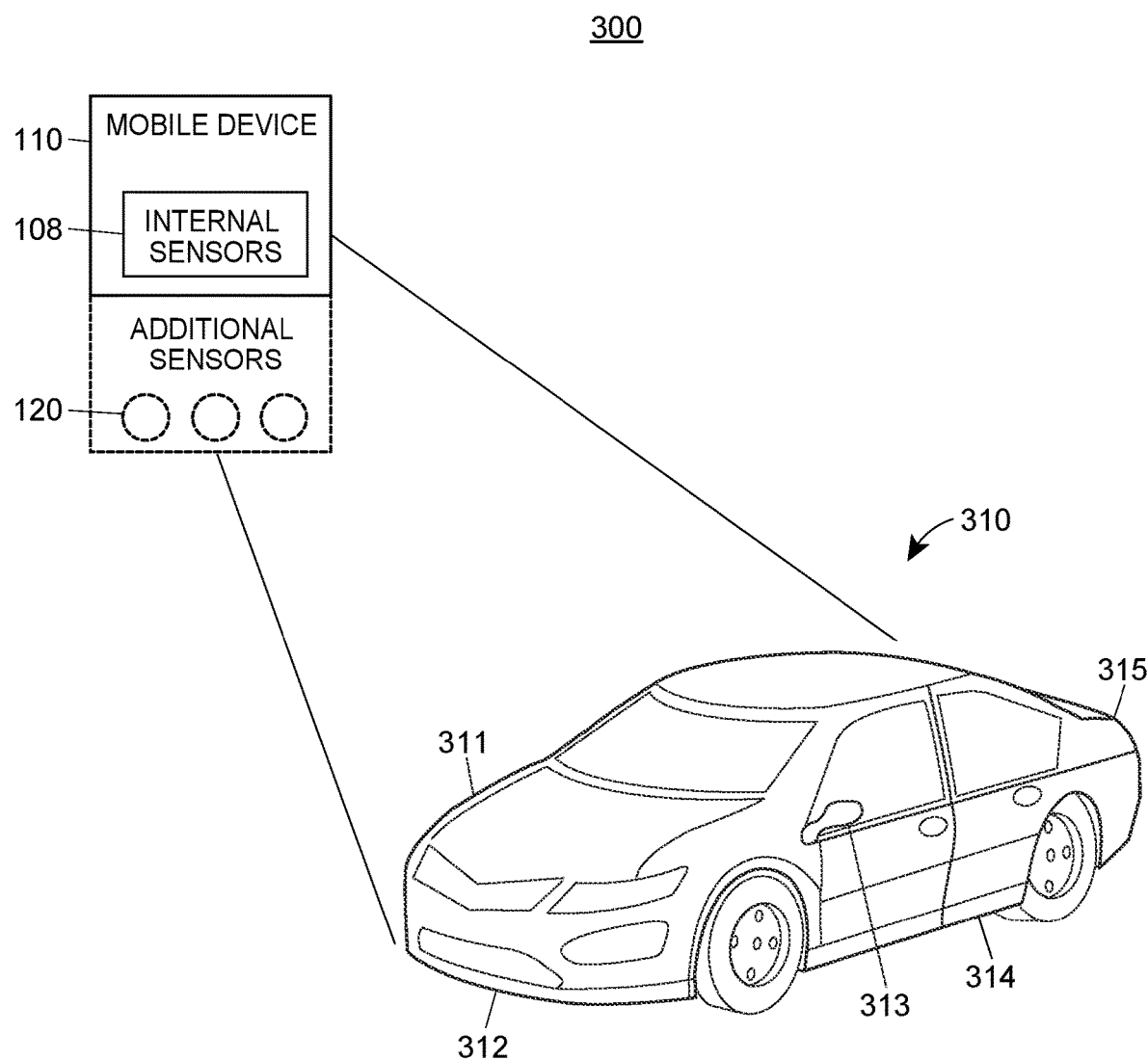
FIG. 3 illustrates an exemplary representation of a vehicle scanning environment.

The system described above may be used, as described further herein, to generate a virtual model of a damaged vehicle based upon a scan of the damaged vehicle by a user of a mobile computing device 110. To better illustrate the operation of the systems and methods described herein, FIG. 3 illustrates an exemplary representation of a vehicle scanning environment 300. The vehicle scanning environment 300 includes one or more mobile computing devices 110 and a vehicle 310. The vehicle 310 may include a plurality of portions or components, such as a hood 311, front bumper 312, side mirror 313, door panel 314, and trunk 315. Other portions or components of vehicles may be used in alternative embodiments. Although the vehicle shown in the exemplary vehicle scanning environment 300 is a passenger automobile, it should be understood that the systems and methods described herein also apply to other types of vehicles (e.g., SUVs, vans, trucks, buses, boats, airplanes, unmanned aerial vehicles, trains, etc.).

As discussed above, the mobile computing device 110 may include internal sensors 108 and may be communicatively connected to additional sensors 120 for capturing data regarding the vehicle 310. The additional sensors 120 may be configured in the form of a camera bar having a plurality of digital cameras. When directed and controlled to capture data, the mobile device 110 may be used to scan portions of the vehicle 310. Scanning the vehicle 310 may include capturing images or otherwise capturing or generating data point associated with various surfaces of the vehicle 310. By moving the mobile device 110 around the vehicle 310, a user can capture data concerning the physical condition of the vehicle 310 from different angles and distances. This data can be combined to generate a virtual model of the vehicle 310 as a three-dimensional (3-D) representation of the vehicle 310 in a 3-D virtual space. Such virtual model may be further used to identify or evaluate damage to the vehicle 310, in some embodiments.

The quality of the virtual model is limited by the quality of data capture using the mobile computing device 110. Inadequate data capture of some regions of the vehicle 310 can result in inaccurate virtual models or virtual models that omit some vehicle damage. Because the virtual model represents the vehicle 310 in a 3-D virtual space as computer-readable data, the user may inadvertently fail to capture portions of the vehicle. For example, the user may scan the sensors 108 and 120 past a portion of the vehicle 310 too rapidly or with excessive variation in speed or position. The resulting data may be adequate for some regions but inadequate for other regions of the portion of the vehicle 310. Without additional guidance or verification, however, the user may be unaware of such problems with the captured data. The methods described herein guide the user to capture high-quality data and verify the quality of the data captured. Thus, the described methods ensure the data points captured when a user scans the vehicle 310 using the mobile computing device 110 are adequate for virtual model generation and analysis.

Guided Vehicle Scanning

To capture data from which to generate a virtual model of a vehicle 310, a user may be guided through various aspects of scanning a portion of the vehicle 310 using a mobile computing device 110. In some embodiments, the scope or extent of data capture may be determined based upon options selected by the user. During or after initial scanning, the sufficiency of the captured data may be evaluated by the mobile computing device 110 or a server 140, and instructions to rescan a portion of the vehicle 310 may be presented to the user if necessary to meet an applicable quality metric. Evaluating the sufficiency of the captured data may include generating a virtual model and evaluating the virtual model, in some embodiments. Additionally, in further embodiments, a virtual model may be evaluated to identify damage to the vehicle 310. Additional data capture or user annotations may be directed based upon detected damage. For example, a user may be instructed to review and enter a note regarding damage to one or more of the vehicle portions 311-315. In some embodiments, options to enter annotations regarding any portion of the vehicle may be presented to the user. In yet further embodiments, the identified or annotated damage may be assessed to determine an estimate of total damage to the vehicle 310, which may be presented to the user for review and further processing.

Figure 4:
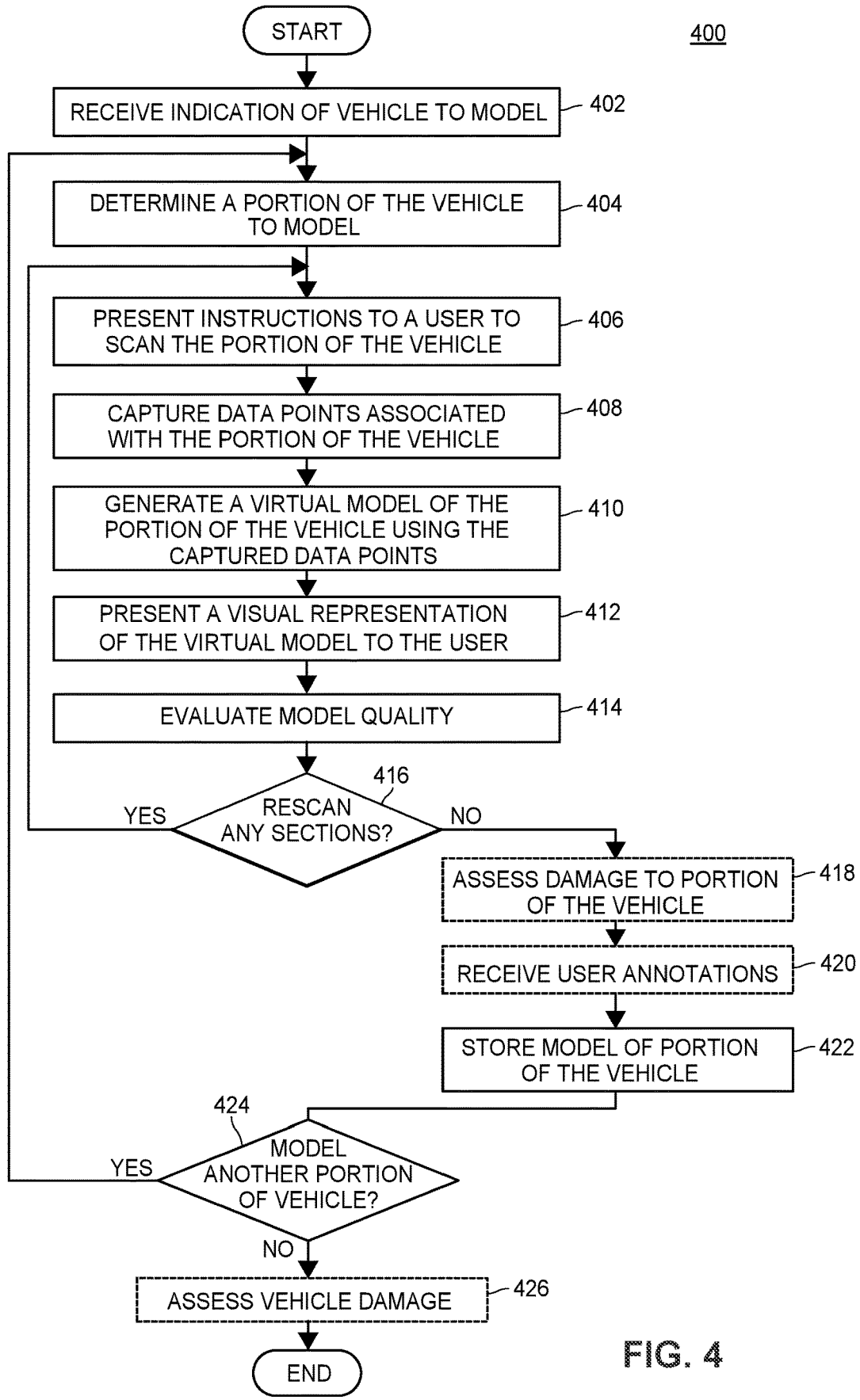
FIG. 4 illustrates a flow diagram of an exemplary directed vehicle scanning method.

FIG. 4 illustrates a flow diagram of an exemplary directed vehicle scanning method 400 for directing a user to scan one or more portions of a vehicle 310. The directed vehicle scanning method 400 determines portions of a vehicle to be scanned, modeled, and evaluated. Instructions for scanning the vehicle are presented to the user, and the resulting data is evaluated to ensure model quality. The directed vehicle scanning method 400 may begin with receiving an indication of a vehicle to model (block 402), such as the vehicle 310. A portion of the vehicle to be modeled may be determined (block 404), and instructions for scanning the portion of the vehicle may be presented to the user (block 406). The user may then operate a mobile computing device 110 to capture data points associated with the portion of the vehicle according to the instructions (block 408). A virtual model of the portion of the vehicle may then be generated (block 410), and a visual representation of the virtual model may be presented to the user to assist with data capture (block 412). A quality metric may be determined and evaluated for the model (block 414), which may be used to determine whether to rescan any sections of the portion of the vehicle (block 416). If no sections are to be rescanned, the method 400 may assess damage to the portion of the vehicle (block 418), receive user annotations relating to the portion of the vehicle (block 420), and/or store the model of the portion of the vehicle (along with determinations of damage or user annotations) (block 422). Whether to model another portion of the vehicle may also be determined (block 424). If further portions of the vehicle are to be modeled, the method 400 may continue by determining another portion of the vehicle to model (block 404). If no further portions are to modeled, in some embodiments, damage to the vehicle may be assessed (block 426). The method 400 may then terminate.

At block 402, the mobile computing device 110 may receive an indication of a vehicle to model, such as the vehicle 310. The indication may be entered by the user or may be automatically generated by the mobile computing device 110, such as upon opening an application. The indication may indicate a type of the vehicle 310 (e.g., a body type or a make/model/year) or other information regarding the vehicle. For example, information regarding a predominant color of the vehicle 310 may be used to improve data capture by selecting a wavelength range in which to scan the vehicle 310 in order to identify likely vehicle pixels in a digital image based upon density of pixels within a color range associated with the vehicle 310. In some embodiments, the indication of the vehicle to model may include vehicle-specific identifying information, such as a vehicle identification number (VIN). In further embodiments, the mobile computing device 110 may determine an indication of the vehicle 110 by identifying a license plate or similar identifier of the vehicle using the camera 254. The license plate data may be received by an application on the mobile computing device 110 as the indication of the vehicle, or the mobile computing device 110 may receive another identifier based upon the license plate data. For example, the mobile computing device 110 may send the license plate data to the server 140 via the network 130 and receive a VIN or similar identifier from the server 140 based upon the license plate data. In some embodiments, receiving an indication of a vehicle to model may include receiving an indication of a specific make and vehicle-model of the vehicle 310, from which a vehicle-model-specific virtual model may be accessed for comparison against the scanned data to determine damage to the vehicle 310.

At block 404, the mobile computing device 110 may determine a portion of the vehicle 310 to model. The portion of the vehicle may be any of the portions 311-315 of the vehicle 310, such as a hood 311, front bumper 312, side mirror 313, door panel 314, or trunk 315. In other embodiments, the portion of the vehicle may be a different part or area of the vehicle 310, such as a driver side of the vehicle, a passenger side of the vehicle, a front side of the vehicle, or a rear side of the vehicle. In further embodiments, the portion of the vehicle 310 may include a component or area within the vehicle, such as an engine, a seat, or a steering column. In still further embodiments, the portion of the vehicle 310 may be the entire vehicle 310. The portion of the vehicle may be determined automatically or may be based upon a user selection of one or more parts of the vehicle 310. In some embodiments, the mobile computing device 110 may use user input (e.g., answers to questions regarding a vehicle accident) or recorded data (e.g., accelerometer data regarding an accident) to determine one or more portions of the vehicle 310 that are likely to be damaged. For example, a sudden shift in telemetric data indicating vehicle movement to the right may be used to determine that the vehicle may have sustained collision damage on its left side. As another example, user selections of answers to a questionnaire regarding an accident may be used to determine areas that are likely damaged and should be modeled. Alternatively, the user may select one or more portions of a vehicle from a list or a visual representation of a generic vehicle. In yet further embodiments, a first scan of the vehicle 310 at a lower resolution may be used to identify likely areas of damage, which may be used to determine one or more portions of the vehicle to be scanned and modeled.

At block 406, the mobile computing device 110 may present instructions to the user for scanning the portion of the vehicle. The instructions may include information regarding a portion of the vehicle 310 to scan using the sensors of the mobile computing device 110. For example, the instructions may indicate to the user one or more portions or components of the vehicle to scan, such as a front bumper 312 or a side mirror 313. Such portions or components may be indicated by descriptive text or visual instructions, such as an image of a vehicle with the portions or components highlighted. Additionally or alternatively, the instructions may actions to be taken by the user in scanning the portion of the vehicle 310. Such actions may include positioning sensors (e.g., aiming a camera 254) of the mobile computing device 110 in order to capture data regarding the portion of the vehicle to be scanned and modeled. For example, the instructions may indicate a distance from the portion of the vehicle at which the position the mobile computing device 110 to capture data. The instructions may further indication a movement sequence or path for capturing data regarding the portion of the vehicle. For example, the instructions may direct the user to move the mobile computing device 110 in an arc at an approximately fixed distance from a surface of the vehicle to capture data points indicating locations on the surface of the portion of the vehicle. In another example, the instructions may direct the user to move the mobile computing device 110 between a plurality of positions at different distances from the surface of the portion of the vehicle. Of course, other instructions for capturing data by scanning the portion of the vehicle using the mobile computing device 110 may be presented in various embodiments.

The mobile computing device 110 may determine instructions for scanning the portion of the vehicle based upon the portion of the vehicle to be scanned, information regarding the vehicle 310, the type or characteristics of the sensors 108 or 120 available to the mobile computing device 110, information regarding likely damage, or other considerations. Different instructions may be presented for capturing data (i.e., scanning) different portions of the vehicle 310, as well as for different types of vehicles. Vehicle condition, age, body type, color, and likely damage may be used to determine instructions to present to the user. In some embodiments, data from onboard sensors of the vehicle 310 may be used by the mobile computing device 110 to determine instructions to present to the user to capture data effectively, such as instructions regarding an angle, distance, or duration of data capture. The characteristics of the available internal sensors 108 or additional sensors 120 may impact the effectiveness of various data capture techniques, so the mobile computing device 110 may determine the instructions based upon characteristics of the available sensors. In some embodiments, the mobile computing device 110 may also determine a subset of the available sensors to use in capturing data regarding the vehicle 310. The mobile computing device 110 may likewise determine areas or portions of the vehicle 310 with an elevated probability of being damaged. Such areas or portions having a high likelihood of damage may be scanned more thoroughly or in greater detail that other portions of the vehicle 310, in which case the instructions may direct the user to take actions to effect such data capture (e.g., allowing more time for data capture at a location). Other considerations may include lighting conditions (e.g., high- or low-light environments, presence of glare, or effectiveness of illumination from the mobile computing device 110) or user selections regarding preferences for receiving instructions, levels of detail in data capture, etc.

The instructions may be presented to the user as text, audio, video, or graphical instructions. In some embodiments, the instructions may include pictorial indicators or other visual cues. Such visual cues may indicate user actions or areas of the vehicle to capture. For example, visual cues indicating movements of the mobile computing device 110 in specified directions may be presented to the user. Such indications may likewise include indications of a speed of movement or a distance to move (e.g., by motion, thickness, size, etc. of some portion of the visual cue). For example, a moving arrow may direct the user to reorient the mobile computing device 110 and move toward an area of the vehicle 310 at a pace indicated by the rate of movement of the arrow. As another example, a visual cue may present an image of one or more portions or areas of the vehicle 310 to be captured, together with indications of whether the portions or areas have already been sufficiently captured (e.g., by changes in color, icons imposed over an image of the vehicle, or other visual representations). Other visual cues may include visual representations associated with one or more virtual models of portions of the vehicle 310. For example, the visual cues may include a color-coded representation of a 3-D virtual model generated from already captured data points for the vehicle 310, indicating the sufficiency of data capture using different colors for different levels of data sufficiency. Such model-derived visual cues may be particularly useful when a user is being instructed to rescan an area, but they may likewise be used in other circumstances.

At block 408, the mobile computing device 110 scan part of the vehicle 310 by capturing data points associated with the portion of the vehicle. A plurality of data points representing locations on one or more surfaces of the portion of the vehicle being scanned may be captured using the internal sensors 108 or additional sensors 120, and such data points may be captured as the user performs the actions indicated by the instructions. In some embodiments, capturing the data points may include determining data points from captured data. For example, the camera 254 may capture images of the portion of the vehicle from multiple angles, which may be compared to determine locations of data points in a 3-D virtual space. Such data points may be further used in generating a 3-D virtual model of the vehicle 310 or a portion thereof.

In some embodiments, the user may follow instructions to take a series of digital photographs or otherwise capture data from a plurality of perspectives relative to the portion of the vehicle. In some such embodiments, the mobile computing device 110 may automatically operate the sensors to capture data, either periodically or when appropriate conditions for capturing data are detected (e.g., when the mobile computing device 110 is positioned to capture the data as instructed). Alternatively, the user may operate the sensors by providing input to the mobile computing device 110 to perform the actions indicated by the instructions. For example, the user may press a virtual button to take a digital photograph. Alternatively, the sensors may operate continuously as the user moves the mobile computing device 110 according to the presented instructions, capturing data as the mobile computing device 110 is repositioned around the vehicle 310.

In further embodiments, the instructions may include a plurality of actions, and the user may select or input a user indication when each action is complete. The user may take an action indicated by a visual cue, such as repositioning the mobile computing device 110 or capturing a digital image at a location. After the action has been performed, the user may provide an indication that the action is complete. If additional instruction remain for scanning the portion of the vehicle, additional instructions may then be presented to the user. In some embodiments, the quality of the data obtained or the action performed may be evaluated whenever the user indicates an action is complete. Alternatively, the quality may be evaluated when all actions have been completed. In yet further embodiments, the user may decline to perform an action, in which case the instructions may be adjusted or the action may simply be removed from the set of actions for scanning the portion of the vehicle.

Data capture may continue until all actions included in the instructions have been performed or until sufficient data has been captured. In some embodiments, the user may indicate completion of data capture by providing an indication of completion to the mobile computing device 110. In further embodiments, the mobile computing device 110 may determine the completion of data capture automatically. Such automatic determination of completion may be based upon user indications that each action indicated by the instructions has been completed or by evaluation of the data captured. In some embodiments, the mobile computing device 110 may generate a virtual model of the portion of the vehicle continuously during data capture (or when a predetermined minimum amount of new data has been captured). Alternatively, the mobile computing device 110 may generate such a virtual model upon completion of scanning for the portion of the vehicle. In either case, the captured data points or the generated model may be evaluated to determine whether the quality of the captured data is sufficient to meet quality metrics for model generation, as discussed further elsewhere herein.

At block 410, the mobile computing device 110 may generate a virtual model of the portion of the vehicle using the captured data points. The virtual model may be generated when sufficient data points are available, either upon determining that data capture is complete or while data capture is ongoing. The mobile computing device 110 may generate the virtual model as a 3-D virtual model representing the shape of one or more scanned surfaces of the vehicle 310 associated with the scanned portion of the vehicle. In some embodiments, generating the virtual model may include using computational geometry techniques to build the virtual model from the data points. Likewise, generating the virtual model may include identifying and removing outlier data points using computational geometric analytics techniques to identify data points that do not fit within statistically determined limits associated with a model of the portion of the vehicle. In some embodiments, the data points may be sent to the server 140 via the network 130, and the virtual model may be generated by the server 140 and sent to the mobile computing device 110 via the network 130.

At block 412, the mobile computing device 110 may present a visual representation of the virtual model to the user via the display 202. The visual representation of the virtual model may include an interactive 3-D model rendered by the mobile computing device 110, a 2D image representing a perspective view of the 3-D virtual model, or an imposition of rendered views of the 3-D virtual model over images captured by a camera 254 of the mobile computing device 110 (i.e., an augmented-reality or mixed-reality view of the virtual model). In some embodiments, the visual representation of the virtual model may include visual indications of areas scanned or not scanned. Such visual indications may include using different colors for areas of the modeled vehicle to indicate the quality of data capture, icons placed over areas to represent the quality of data capture, or other indications wherefrom the user may visually discern the sufficiency of data captured for each of a plurality of areas within the portion of the vehicle. Presenting such visual indications to the user enables the user to identify areas needing to be recaptured (i.e., rescanned) in order to obtain a virtual model of sufficient quality for further analysis. This is advantageous because the user typically will not have direct access to the electronic data captured by the sensors, nor can the user determine whether such electronic data captured for each area within a portion of the vehicle is sufficient for automated 3-D virtual model generation.

In some embodiments, the visual representation may include one or more indications of areas of a surface of the vehicle 310 for which sufficient data points have been captured to generate a virtual model meeting a relevant quality metric. Alternatively, the visual representation may include one or more indications of areas of a surface of the vehicle 310 for which sufficient data points have not been captured to generate a virtual model meeting the quality metric. This may occur when a surface is identified based upon some data points, but the data points are too few or too inaccurate to model the surface with acceptable error terms. This may likewise occur when a baseline model of a specific make and vehicle-model of the vehicle 310 or of a generic vehicle body type (e.g., sedan, SUV, or light truck) is used to guide the user in capturing data points, such that expected surfaces may be indicated as lacking sufficient detail until sufficient data has been captured for the such surfaces. In various embodiments, the visual representations may indicate for areas associated with surfaces of the vehicle 310 either (i) sufficiency or insufficiency of the captured data points or (ii) levels of quality (relating to sufficiency or insufficiency for model generation) of the captured data points.

At block 414, the mobile computing device 110 may evaluate the quality of the virtual model generated based upon the captured data. Evaluating the virtual model may include generating a value of a quality metric for part or all of the virtual model, which may be compared with a predetermined or dynamically determined quality threshold corresponding to the quality metric. The quality metric may indicate either or both of the quality of the model in matching the captured data points or the quality of the captured data points for model generation, as both factors impact the quality of the generated virtual model for vehicle damage analysis. Such quality metrics may include a statistical estimate of error (e.g., the residual variation of the data points from the values predicted by the virtual model), a measure of the explanatory power of the model (e.g., a measure of goodness of fit), a measure of complexity of the model (e.g., with more complex models indicating an attempt to fit the model to lower-quality captured data), or any other type of metric indicating the quality or sufficiency of the captured data or the model generated therefrom in accurately representing the condition of the vehicle 310. The mobile computing device 110 may use computational geometric analytics to evaluate the virtual model (or a section thereof) and determine the quality metric. For example, the virtual model may be analyzed to determine whether the virtual model maintains a reasonable level of coherence or smoothness. However generated, the quality metric may be used to determine whether data capture has reached completion or whether additional or substitute data should be obtained.

In some embodiments, the quality may be evaluated or estimated directly from analysis of the captured data, rather than analysis of the virtual model. For example, the density of captured data points within a region or the consistency between data points in a region that are captured at different wavelengths may be used to evaluate the quality or sufficiency of the captured data for purposes of modeling, without requiring a virtual model to be generated. Thus, the evaluation of model quality may be performed using the data points captured by the sensors 108 or 120 of the mobile computing device 110, without generating or without evaluating the virtual model.

At block 416, the mobile computing device 110 may determine whether to rescan any sections of the portion of the vehicle. Thus, the mobile computing device 110 may determine whether the data capture for the portion of the vehicle is complete based upon the evaluation of the virtual model. Such determination of completion of data capture may be made by comparing one or more quality metrics to corresponding quality thresholds. If the virtual model is determined not to be of sufficient quality (e.g., if the quality metric value does not meet the corresponding quality threshold), the mobile computing device 110 may cause data capture to continue in order to rescan the portion of the vehicle. Rescanning the portion of the vehicle may include capturing or recapturing data for one or more sections of the portion of the vehicle, in a manner similar to that discussed above. Thus, the mobile computing device 110 may generate and present instructions to a user for rescanning the one or more sections (block 406), capture additional data points associated with the one or more sections (block 408), and generate or update a virtual model for the one or more sections using the additional data points (block 410). The mobile computing device 110 may likewise present a new or updated visual representation of the virtual model to the user (block 412) and evaluate the quality of the new or updated model (block 414) to determine whether to rescan any sections of the portion of the vehicle (block 416). The method 400 may continue to rescan sections of the portion of the vehicle until the model is determined to be of sufficient quality, until a time or similar limit is reached, or until the user selects to proceed notwithstanding the low quality. Once the mobile computing device 110 determines not to rescan any sections of the portion of the vehicle, the method 400 may proceed to assess or store the virtual model.

At block 418, in some embodiments, the mobile computing device 110 may assess damage to the portion of the vehicle based upon the virtual model. Damage may be assessed automatically by analyzing the virtual model, or damage may be indicated by the user or another reviewer of the virtual model. Automatically assessing damage to the portion of the vehicle may include identifying abnormalities associated with virtual surfaces of the virtual model, such as sharp indents or modeled surfaces that do not connect to other surfaces of the vehicle. In some embodiments, abnormalities may be detected by comparing the generated model against a baseline model of a corresponding undamaged portion of a similar vehicle (e.g., a model of a new vehicle of the same make and vehicle-model as the vehicle 310). In some embodiments, a user may be further guided to rescan a section of the vehicle 310 based upon a determination that the section is or may be damaged. In such instances, additional instruction may be presented to the user to capture further data points associated with the damaged section. Automatic or manual damage assessment may be performed at the mobile computing device 110 or the server 140, as further discussed elsewhere herein. If no damage is identified for the portion of the vehicle, the method 400 may proceed, with or without user annotations.

At block 420, in some embodiments, the mobile computing device 110 may receive one or more user annotations regarding the portion of the vehicle. The user annotations may be associated with virtual locations within the virtual model of the portion of the vehicle, such as locations of damage. The user annotations may indicate locations or extents of damage, including damage identified from the virtual model or damage not identified from the virtual model (e.g., scratches, fire damage, water damage, or other damage not readily discernible from the virtual model). The user annotations may likewise provide additional information regarding the portion of the vehicle, regardless of damage. In some embodiments, the user may be prompted to enter a user annotation regarding the portion of the vehicle, as discussed further elsewhere herein.

At block 422, the mobile computing device 110 may store the virtual model of the portion of the vehicle. The virtual model may be stored in the data storage 222 of the mobile computing device, or the virtual model may be stored in the database 146 of the server 140. Any user annotations may likewise be stored, either separately or together with the virtual model. In some embodiments, the captured data (or part thereof) may likewise be stored for further use or for verification. For example, one or more images associated with a damaged section of the vehicle may be stored for verification for further analysis.

At block 424, the mobile computing device 110 may determine whether to model another portion of the vehicle 310. The determination may be based upon a user selection of one or more options regarding other portions of the vehicle, or the determination may be made automatically. Automatic determinations of portions of the vehicle to model may be generated based upon predetermined sets of portions of vehicles, information regarding an accident or other collision (e.g., telematics data indicating likely areas of damage to the vehicle 310), or damage detected in any previously modeled portion of the vehicle (e.g., severe damage or damage extending to an edge of the modeled portion of the vehicle). If another portion of the vehicle is to be modeled, the method 400 may continue by determining the next portion of the vehicle to model (block 404), after which the previously discussed actions may be performed for the next identified portion of the vehicle. If no other portion of the vehicle is to be modeled, the method 400 may continue with assessing damage to the vehicle 310 (block 426) or may terminate.

At block 426, in some embodiments, the mobile computing device 110 may assess damage to the vehicle 310 based upon the damage identified for each modeled portion of the vehicle. In some embodiments, the mobile computing device 110 may send information regarding the vehicle 310 (e.g., models of damaged portions, user annotations, or captured data) to the server 140 for further analysis. When damage to one or more portions of the vehicle is identified, the mobile computing device 110 or server 140 may further assess the extent of the damage. Assessing the extent of the damage may include identifying one or more vehicle components associated with the damage, as well as generating an estimate of the damage or associated repairs, as further discussed elsewhere herein. In some embodiments, assessing the damage to the vehicle 310 may include generating a report for filing an insurance claim. When the damage to the vehicle 310 has been assessed, the method 400 may terminate.

Figure 5:
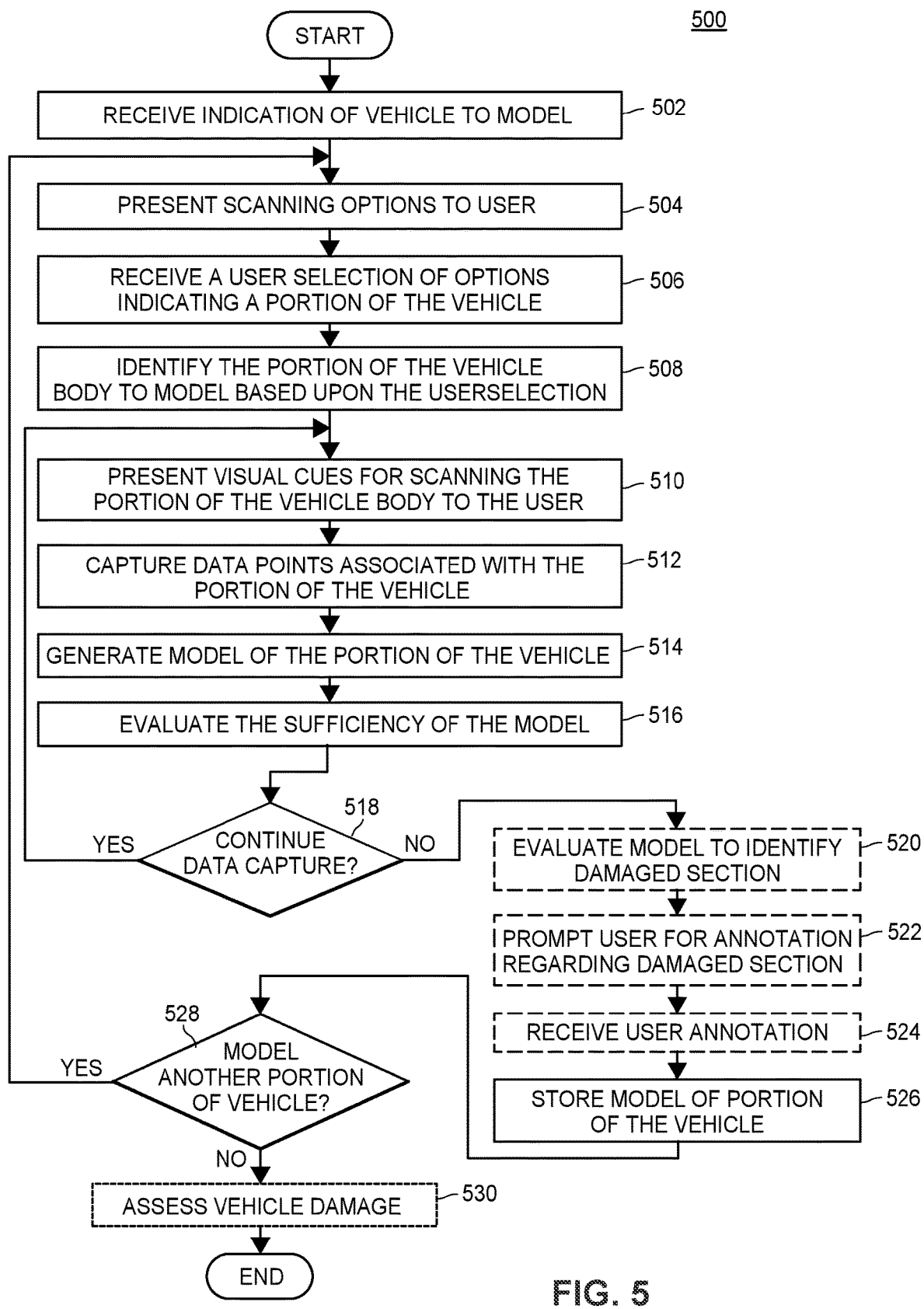
FIG. 5 illustrates a flow diagram of an exemplary iterative vehicle scanning method.

FIG. 5 illustrates a flow diagram of an exemplary iterative vehicle scanning method 500 for presenting options and instructions to a user for scanning user-selected portions of a vehicle 310. The iterative vehicle scanning method 500 allows the user to select a portion of the vehicle to scan and model. Upon receiving a user selection, instructions are presented to the user, and the resulting data is evaluated to ensure model quality. Additional portions of the vehicle may be selected, scanned, modeled, and evaluated. The iterative vehicle scanning method 500 may begin by receiving an indication of a vehicle to model (block 502), such as the vehicle 310. The mobile computing device 110 may then present scanning options to the user (block 504) and receive a user selection of options (block 506), which directly or indirectly a portion of the vehicle to scan. The portion of the vehicle to scan may then be identified based upon such selection (block 508), and visual cues may be presented to the user for scanning the portion of the vehicle (block 510). Data points associated with the portion of the vehicle may be captured using the mobile computing device 110 (block 512), and a model of the portion of the vehicle may be generated (block 514) and evaluated (block 516). The mobile computing device 110 may determine whether to continue data capture (block 518). When data capture is complete, the model may be evaluated to identify damage (block 520), in which case the user may be prompted to enter a user annotation regarding a damaged section (block 522). A user annotation may be received from the user (block 524) and stored with the virtual model of the portion of the vehicle (block 526). Whether to model another portion of the vehicle may also be determined (block 528). If further portions of the vehicle are to be modeled, the method 500 may continue by presenting additional scanning options to the user (block 504) and receiving an addition user selection of options for scanning an additional portion of the vehicle (block 506). If no further portions are to be modeled, in some embodiments, damage to the vehicle may be assessed (block 530). The method 500 may then terminate.

At block 502, the mobile computing device 110 may receive an indication of a vehicle to model, such as the vehicle 310. The indication may be entered by the user or may be automatically generated by the mobile computing device 110, as discussed further elsewhere herein.

At block 504, the mobile computing device 110 may present one or more scanning options to the user. The scanning options may include options for selecting one or more portions of the vehicle 310 to model, as well as options associated with aspects of data capture, vehicle damage, or other aspects of scanning and modeling the portion of the vehicle. Options relating to data capture may include options associated with levels of detail or model resolution or options associated with types of sensors available (e.g., options to connect to additional sensors 120 or options to identify sensors 108). Options associated with vehicle damage may allow the user to indicate an extent, type, or area of damage to the vehicle 310, from which the mobile computing device 110 may determine settings or aspects of data capture. In some embodiments, the options may include an option to automatically determine one or more portions of the vehicle to scan, such as by analysis of telematics or onboard diagnostic data. In further embodiments, the options may include information regarding presentation of instructions to the user, as visual cues or otherwise. For example, the user may select whether to view indications of quality of data captured, indications of areas sufficiently captured, or indications of areas not sufficiently captured. In some embodiments, the scanning options may include options to assess vehicle damage based upon previously scanned portions of the vehicle or options not to scan any additional portions of the vehicle. Such options may be presented to the user after an initial section has been modeled.

At block 506, the mobile computing device 110 may receive a user selection of one or more of the scanning options. The user selection may directly or indirectly indicate one or more portions of the vehicle to scan and model. In some embodiments, the user may directly select a portion of the vehicle from a list, from a diagram of a vehicle, or otherwise. In some embodiments, the user selection may indirectly indicate the portion of the vehicle to scan and model, such as a user selection of an option to automatically identify portions of the vehicle to scan.

At block 508, the mobile computing device 110 may identify the portion of the vehicle to scan based upon the user selection of the one or more scanning options. In some embodiments, this may include presenting instructions to the user to perform a preliminary scan of the vehicle 310, evaluating the preliminary scan data (such as by generating a preliminary model or performing image processing on one or more images), and identifying one or more portions of the vehicle associated with probabilities of damage above a preliminary threshold. In this way, the mobile computing device 110 may automatically identify portions of the vehicle to be scanned and modeled based upon a limited preliminary scan. In further embodiments, automatically identifying portions of the vehicle to be scanned may include sending the preliminary scan data to the server 140 via the network 130 for analysis and receiving an indication of one or more portions of the vehicle to be scanned from the server 140.

At block 510, the mobile computing device 110 may present visual cues or other instructions to the user for scanning the portion of the vehicle. The visual cues may indicate user actions, areas of the vehicle to capture, or areas of the vehicle already captured, as discussed elsewhere herein. In some embodiments, the visual cues may include parts of a virtual model as the model is generated from captured data, as discussed further elsewhere herein. For example, the visual cues may be presented as rendered images of 3-D meshes in a virtual space. In further embodiments, the visual cues may include a representation of a 3-D point cloud of data captured by the sensors of the mobile computing device 110, which may be presented in an empty virtual space or may be superimposed over an image of the vehicle 310 from a camera 254 of the mobile computing device 110. As more data points are captured (e.g., determined based upon images captured by the camera 254), the additional data points may appear on the display 202 of the mobile computing device 110 to indicate to the user locations on surfaces of the vehicle 310 that have been captured. The points may be represented by different shapes or colors to further indicate the sufficiency of data captured in particular areas, which may be determined based upon evaluation of a virtual model generated from the data points or based upon density of data points within a part of the virtual space (e.g., density of data points within a unit sphere or cube within the virtual space). Such evaluation may utilize a previously generated model of the portion of the vehicle currently being scanned, once sufficient data points to generate a model of at least a part of the portion of the vehicle have been captured.

At block 512, the mobile computing device 110 may capture data points associated with the portion of the vehicle. The data points may be directly or indirectly captured using the internal or additional sensors 108 or 120 of the mobile computing device 110 (e.g., determined based upon images captured by the camera 254), as discussed elsewhere herein. Data capture may proceed according to the visual cues presented via the display 202. As discussed elsewhere herein, data capture may precede or may be concurrent with 3-D virtual model generation, which may be continuous or may occur upon completion of data capture. In some embodiments, data capture may continue until completion of data capture is determined based upon completion of each of a set of visual cues, which set of visual cues may be an ordered series or an unordered set. The completion of data collection for each visual cue may be determined automatically by the mobile computing device 110 based upon the data captured, or completion may be indicated by the user by inputting an indication of completion of the data capture associated with the visual cue. When each data capture associated with each visual cue in the set is determined or indicated to be complete, the mobile computing device 110 may determine data capture for the portion of the vehicle to be complete. In further embodiments, data capture associated with each visual cue may continue concurrently with model generation and evaluation (blocks 514 and 516), with new visual cues being presented to the user (block 510) based upon the evaluation of the model, until the model is determined to be of sufficient quality (block 518). Such new visual cues may be predetermined before data capture begins or may be generated in real-time during data capture.

At block 514, the mobile computing device 110 may generate a virtual model of the portion of the vehicle based upon the captured data points. Such model generation may occur upon completion of a part of the data capture (e.g., completion of data capture associated with a particular visual cue as indicated by a user indication of completion) or periodically while data capture is ongoing, as discussed elsewhere herein. Also as discussed elsewhere herein, a visual representation of the generated virtual model may be presented to the user via the display 202 in some embodiments.

At block 516, the mobile computing device 110 may evaluate the sufficiency of the generated virtual model of the portion of the vehicle. Such evaluation may include generating and evaluating a quality metric for the virtual model (or directly for the captured data), as discussed elsewhere herein. In some embodiments, information regarding model quality may be presented to the user for review and a decisions regarding continuation of data capture.

At block 518, the mobile computing device 110 may determine whether to continue data capture for the portion of the vehicle. The determination of completion may be made automatically based upon the evaluation of the quality or sufficiency of the virtual model, or the determination of completion may be based upon user input. In some embodiments, an preliminary determination of completion may be determined automatically and presented to the user for a decision whether to continue or terminate data capture for the portion of the vehicle. For example, the mobile computing device 110 may determine a quality metric of the virtual model meets a minimal quality threshold and present such information to the user with a recommendation of whether to continue data capture to improve model quality or to terminate data capture for the portion of the vehicle. In further embodiments, the user may input one or more completion indications. For example, the user may select an option to halt data capture and generate a virtual model. Such completion indications may also include selections by the user of an option to receive another visual cue or to indicate completion of data capture movements associated with a current visual cue. Upon receipt of such user indication of completion of data capture associated with a visual cue, the mobile computing device 110 may determine whether additional visual cues are to be presented to the user for additional data capture. If no such additional data cues are identified, the mobile computing device 110 may determine completion of data capture from the indication received from the user. In further embodiments, the mobile computing device 110 may determine and present information regarding the generated model to the user in order to confirm completion or continue data capture. For example, an estimate of the quality or detail level of the virtual model may be presented to the user. A response may then be received from the user indicating either verification of completion or continuation of data capture. When the user response confirms completion of data capture upon review of the information, data capture for the portion of the vehicle may terminate.

At block 520, in some embodiments, the mobile computing device 110 may evaluate the generated virtual model to identify any damaged sections of the portion of the vehicle. The model may be evaluated automatically based upon analysis of the geometric properties of the modeled vehicle surfaces, or the modeled vehicle surfaces may be compared against a baseline model to detect areas of divergence between the models, as discussed elsewhere herein. In some embodiments, damaged sections of the vehicle 310 may be detected by identifying abnormalities within the virtual model based upon computational geometric analysis of the virtual surfaces of the vehicle model. Such computational geometric analysis may include determining holes, dents, breaks, or other disruptions in an otherwise smooth surface within the virtual model. Upon identifying such abnormalities within the virtual model, the mobile computing device 110 may further identify one or more damaged sections of the vehicle based upon the location of the abnormalities. Determining the damaged sections may include identifying damaged vehicle components, which may further be used in determining repairs for the vehicle 310. In various embodiments, automatic or manual virtual model evaluation may be performed at the mobile computing device 110 or the server 140, as further discussed elsewhere herein At block 522, in some embodiments, the mobile computing device 110 may prompt the user to enter a user annotation regarding a damaged section of the vehicle 310. The prompt may include an indication of the damaged section, which may further include information such as a component identified as damaged, extent or degree of damage, determined repairs needed, estimated repair time, estimated repair costs, or other information regarding the damage. The prompt may further request user verification of the identified damage. In some embodiments, the prompt may include a request for the user to identify or select one or more damaged vehicle components.

At block 524, in some embodiments, the mobile computing device 110 may receive a user annotation associated with the portion of the vehicle. The user annotation may be associated with the portion of the vehicle, generally, or may be associated with a particular location within the virtual model (e.g., a position associated with damage on a surface within the virtual model or a representation of a vehicle component identified as damaged). The user may select a location associated with the annotation, or the location may be determined and presented to the user. The user annotation may provide additional information regarding damage to the vehicle or may confirm or disconfirm a determination of damage derived from the virtual model, as discussed elsewhere herein.

At block 526, the mobile computing device 110 may store the virtual model of the portion of the vehicle. The virtual model may be stored in the data storage 222 of the mobile computing device, or the virtual model may be stored in the database 146 of the server 140. Any user annotations received from the user may likewise be stored, either separately or together with the virtual model, as may part or all of the captured data. For example, one or more images associated with a damaged section of the vehicle may be stored for verification for further analysis.

At block 528, the mobile computing device 110 may determine whether to model another portion of the vehicle 310. To determine whether to model another portion of the vehicle, the mobile computing device 110 may present one or more options to the user relating to additional sections of the vehicle to scan and model. For example, the user may be prompted to select another portion of the vehicle to scan or to select an option indicating completion of vehicle scanning. In other embodiments, another portion of the vehicle may be determined based upon an earlier decision regarding vehicle portions to scan and model. For example, the user may have previously selected a set of vehicle portions to model, in which case the mobile computing device 110 may simply determine whether all vehicle portions in the set have been scanned and modeled. If another portion of the vehicle is to be scanned and modeled, the method 500 may continue with presenting scanning options to the user (block 504), which may include selection of a specific additional portion of the vehicle to scan. If no further portions of the vehicle are to be scanned and modeled, the method 500 may continue with an assessment of damage to the vehicle 310 (block 530).

At block 530, in some embodiments, the mobile computing device 110 may assess damage to the vehicle 310 based upon the models of the portions of the vehicle or based upon the damage identified for each modeled portion of the vehicle, as discussed elsewhere herein. In some embodiments, the mobile computing device 110 may send information regarding the vehicle 310 (e.g., models of damaged portions, user annotations, or captured data) to the server 140 for further analysis. In some embodiments, damage estimates may be generated based upon the virtual models and/or user annotations, which damage estimates may include estimates of required repairs, repair timing, or repair cost. In some embodiments, assessing the damage to the vehicle 310 may include generating a report for filing an insurance claim. When the damage to the vehicle 310 has been assessed, the method 500 may terminate.

Model Evaluation and Damage Assessment

Figure 6:
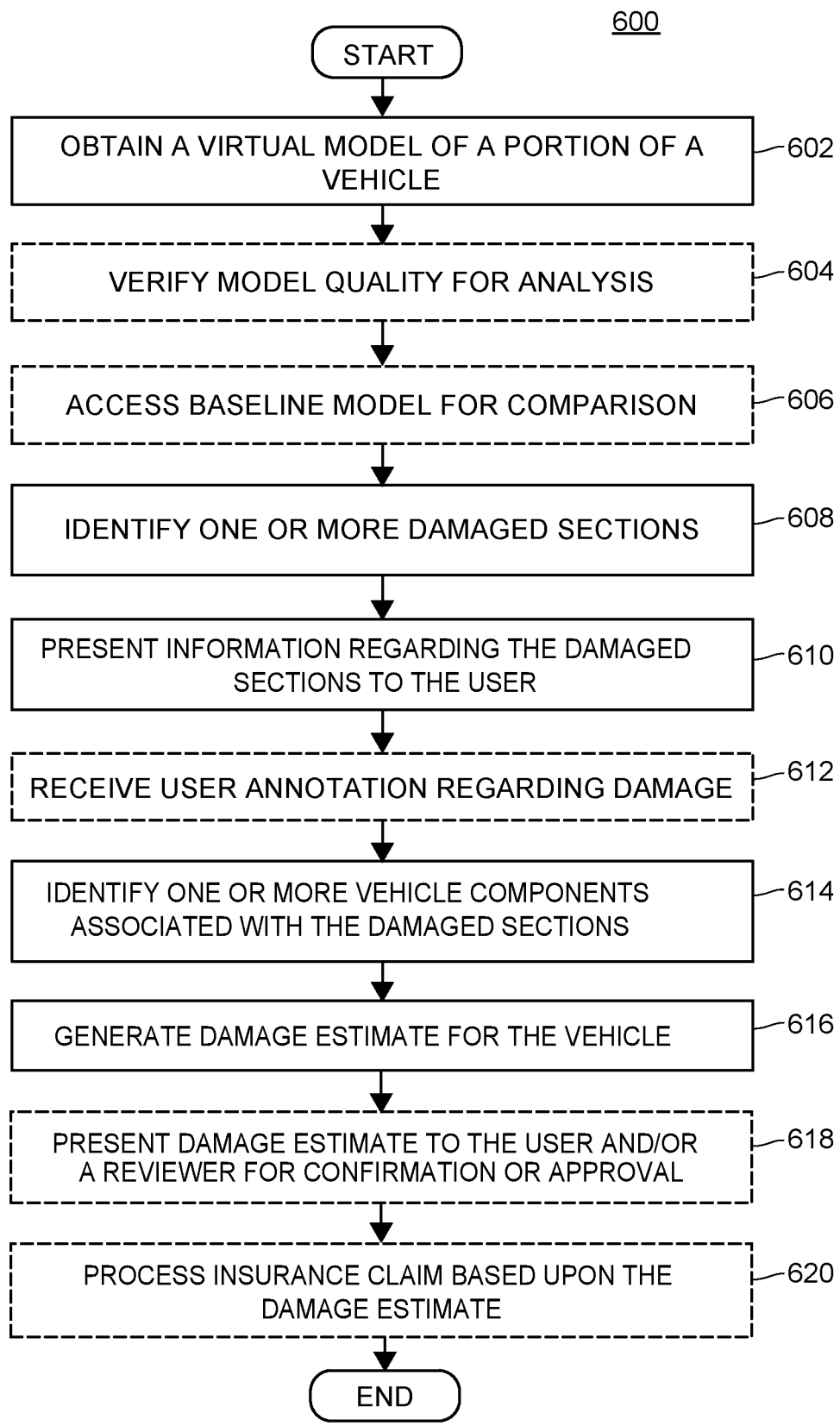
FIG. 6 illustrates a flow diagram of an exemplary model evaluation and damage assessment method.

FIG. 6 illustrates a flow diagram of an exemplary model evaluation and damage assessment method 600, which may be implemented in conjunction with the systems and methods described elsewhere herein to identify and assess damage to a vehicle 310. The model evaluation and damage assessment method 600 may begin by obtaining a virtual model of a portion of a vehicle (block 602), the quality of which may be verified to ensure the model is of sufficient quality for damage analysis (block 604). In some embodiments, a baseline model of a similar vehicle may be accessed for comparison (block 606). From the virtual model or models, one or more damages sections of the vehicle may be identified (block 608). Information regarding the damages sections may be presented to the user (block 610), and, in some embodiments, a user annotation regarding the damage may be received (block 612). Vehicle components associated with the damaged sections of the vehicle may be identified (block 614), and a damage estimate for the vehicle may be generated (block 616). In some embodiments, the damage estimate may be presented to the user or other reviewer for confirmation or approval (block 618), and an insurance claim may be processed based upon the damage estimate following such approval (block 620). The method 600 may then terminate. Although the following discussion refers to operations being performed by the mobile computing device 110 for readability, it should be understood that any or all of the operations may be performed by the server 140 or by a combination of the mobile computing device 110 and the server 140, in various embodiments.

At block 602, the mobile computing device 110 may obtain a virtual model of a portion of the vehicle. Obtaining the virtual model may include accessing a stored model or guiding a user to scan a vehicle to generate the virtual model, as discussed elsewhere herein.

At block 604, in some embodiments, the mobile computing device 110 may verify the sufficiency of model quality for analysis. Such verification may include comparing a quality metric for the virtual model against a quality threshold, as discussed elsewhere herein. If the model is being obtained by guiding the user in scanning the vehicle 310, the mobile computing device 110 may direct continued data capture until the model is of sufficient quality for analysis. Model quality verification may be omitted in some embodiments, particularly where model quality has been previously evaluated prior to storing a virtual model accessed during implementation of the method 600.

At block 606, in some embodiments, the mobile computing device 110 may access a baseline model associated with a similar vehicle for comparison. Such baseline model may be a virtual model specific to a make and model of vehicle, or the baseline model may be a general model of a type of vehicle.

At block 608, the mobile computing device 110 may identify one or more damaged sections of the vehicle based upon the virtual model. The damaged sections may be identified automatically based upon the virtual model (and, in some embodiments, the baseline model). The damaged sections may be identified by computational geometric analysis of the model or models to identify or analyze surfaces in the models. Virtual surfaces within the virtual model may be identified corresponding to surfaces of the vehicle 310. Abnormalities in the surfaces may be identified based upon analytical analysis of the virtual surfaces or by comparison with the baseline model. Such abnormalities may include holes, dents, missing or broken parts, or other indications of divergence from an expected or smooth surface, which may indicate damage. Where a baseline model is used for damage determination, damaged sections may be identified based upon differences beyond a threshold level between the baseline model and the virtual model generated based upon a user scan of the vehicle 310. In some embodiments, the damaged sections may be identified based upon user annotations associated with the virtual model. For example, a user annotation stored with the virtual model may indicate a type or location of damage.

At block 610, the mobile computing device 110 may present information regarding the damaged sections to the user via the display 202. Such information may include an indication of a location or region of damage identified by evaluation of the virtual model, which may be presented as a visual representation of the differences or the damaged area. Such information may also include information regarding the damage or a prompt for additional user annotation or verification.

At block 612, in some embodiments, the mobile computing device 110 may receive a user annotation regarding the damage. The user annotation may be received in response to a prompt presented to the user, as discussed elsewhere herein. The user annotation may include information indicating a location within the virtual model associated with the damage to the vehicle 310, and such annotation may further include information identifying a type, extent, or component associated with the damage.

At block 614, the mobile computing device 110 may identify one or more vehicle components associated with the damaged sections. Such identification may be based upon the locations of the identified damaged sections or may be based upon user annotations associated with the damage. For example, a location associated with a user annotation may be used to determine damaged vehicle components. In some embodiments, identifying vehicle components associated with the damaged sections may include identifying damaged vehicle components indicated by the user in user annotations.

At block 616, the mobile computing device 110 may generate a damage estimate for the vehicle 310 based upon the identified damaged vehicle components. Generating the damage estimate for the vehicle may include assessing the extent of damage to the vehicle based upon the virtual model and/or user annotations. Assessing the extent of the damage may include estimating an extent of damage to the identified vehicle components, as well as determining repairs to fix the damage. Such repairs may be determined based upon the severity of the damage and may include estimates of costs for such repairs (e.g., costs of parts, labor, and towing). Estimates of time required for repairs may also be generated, and information regarding vehicle repair facilities capable of performing such repairs may be identified. In some embodiments, the extent of damage may be assessed based upon information regarding repair of similar damage to other vehicles.

At block 618, in some embodiments, the mobile computing device 110 may present the damage estimate to the user or another reviewer for confirmation or approval. The damage estimate may include summary information or detailed information regarding the estimate. The damage estimate may be presented as part of a damage or claim report generated from the data, including the estimated damage to vehicle components, information regarding the vehicle 310, or user annotations. Such report may be used for insurance claim processing in some embodiments.

At block 620, in some embodiments, the mobile computing device 110 may process an insurance claim based upon the damage estimate, which may include the damage or claim report. Such processing may include fund transfers associated with repairs or scheduling repairs for the vehicle 310. The method 600 may then terminate.

User Interface for Guided Vehicle Capture

FIGS. 7A-D illustrate exemplary user interfaces that may be used to present information to a user and receive information from the user, according to the systems and methods described above. These user interfaces may be presented via the display 202 of the mobile computing device 110. In preferred embodiments, the display 202 may also serve as an input 208 for receiving user selections, annotations, or other information entered by the user. The illustrated user interfaces are exemplary only, and alternate or additional user interfaces may be used in various embodiments.

Figure 7A:
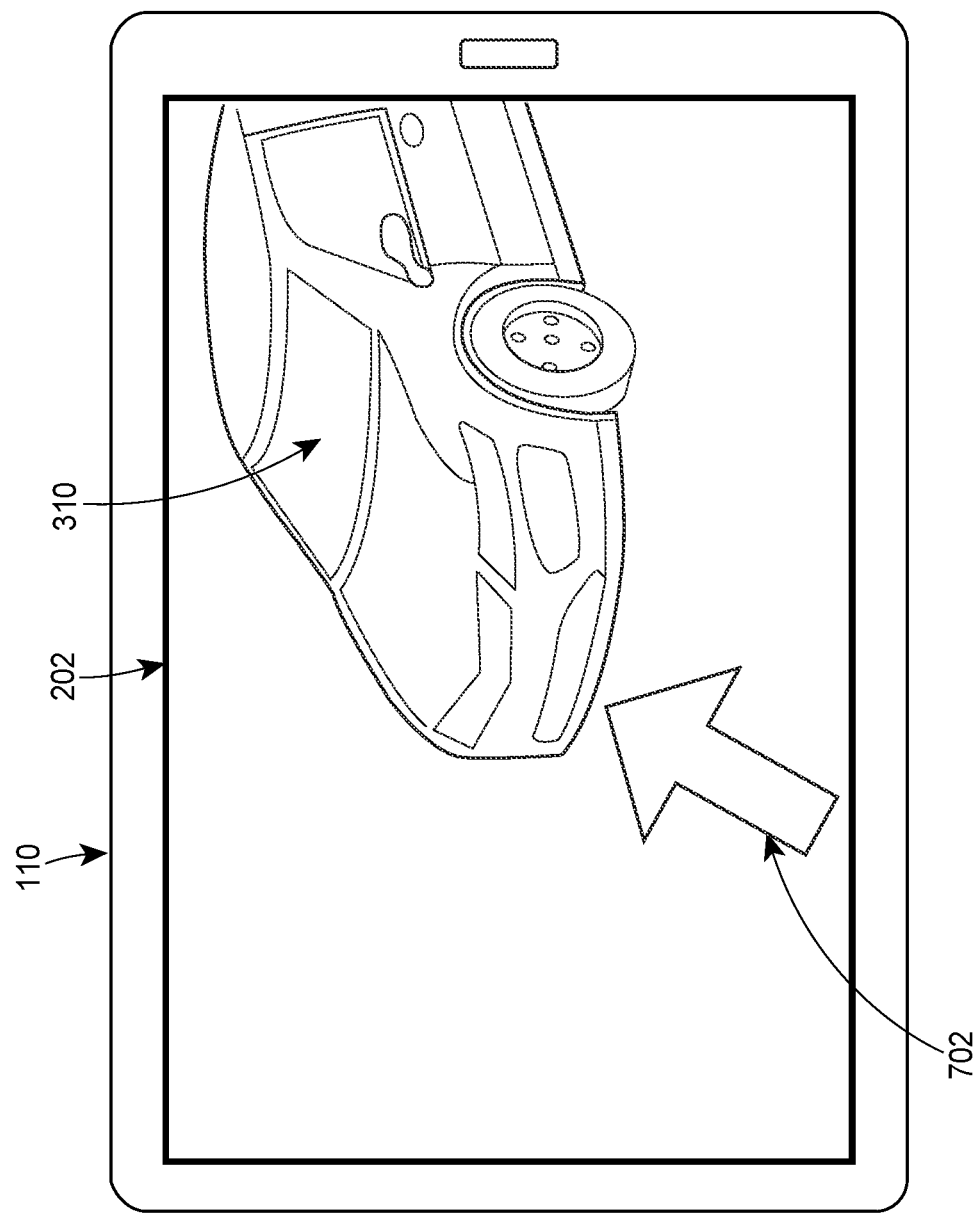
FIG. 7A illustrates an exemplary user interface including data capture instructions for scanning a portion of a vehicle.

FIG. 7A illustrates an exemplary user interface including data capture instructions for scanning a portion of the vehicle 310. The data capture instructions include a movement cue 702, depicted as an arrow superimposed over an image of the vehicle 310 on the display 202. Such movement cue 702 is a type of visual cue, as discussed elsewhere herein, to the user to move the mobile computing device 110 closer to the indicated portion of the vehicle 310 in order to capture data points using the sensors 108 or 120. The movement cue 702 may move in some embodiments to attract the attention of the user. In further embodiments, the speed of the movement of the movement cue 702 may indicate a desired rate of movement of the mobile computing device 110 to the user.

Figure 7B:
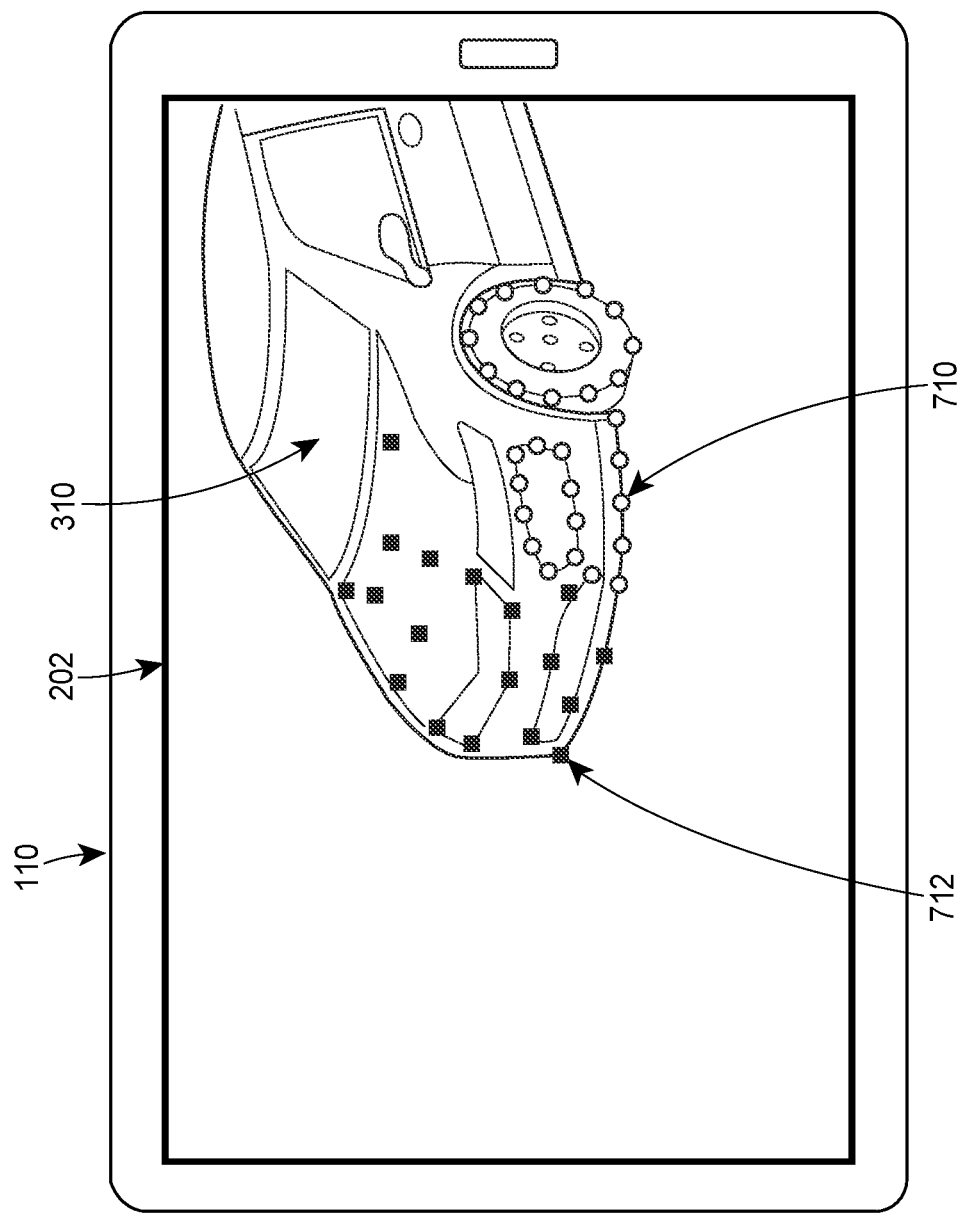
FIG. 7B illustrates an exemplary user interface including indicators of captured areas of a vehicle.

FIG. 7B illustrates an exemplary user interface including indicators of captured areas of the vehicle 310. The illustrated indicators include captured area indicators 710 and insufficient data indicators 712, both of which may be visual cues as discussed elsewhere herein. The captured area indicators 710 are illustrated as white circles representing captured data points for areas of the vehicle that have been sufficient captured, while the insufficient data indicators 712 are illustrated as black squares representing parts of the vehicle 310 for which sufficient data has not been captured. The insufficient data indicators 712 may represent captured data points of insufficient density or insufficient quality to generate a virtual model of sufficient quality. By presenting such captured area indicators 710 or insufficient data indicators 712, the mobile computing device 110 presents visual cues to the user regarding areas that are adequately scanned or that require additional scanning. In alternate embodiments, the sufficiently captured areas may instead by represented by rendering virtual surfaces of the vehicle and superimposing the virtual surfaces above an image of the vehicle 310 on the display 202.

Figure 7C:
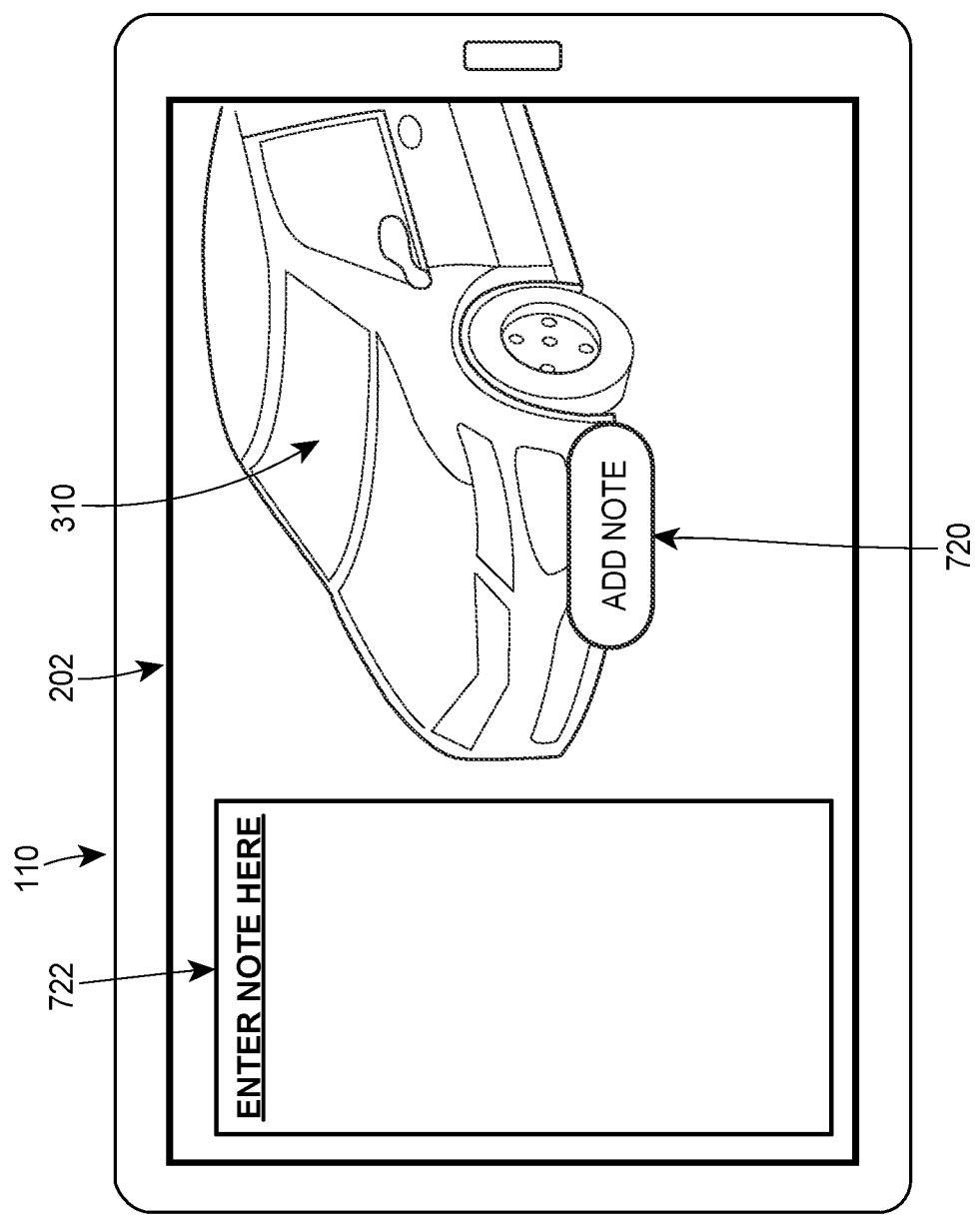
FIG. 7C illustrates an exemplary user interface including an indicator associated with a user annotation.

FIG. 7C illustrates an exemplary user interface including an indicator associated with a user annotation relating to the vehicle 310. The illustrated interface includes an annotation locator 720 for indicating a location on the virtual model associated with the user annotation and a text box 722 for entering the user annotation. The annotation locator 720 may be placed by the user or may be automatically generated based upon identification of damage, as discussed elsewhere herein. Upon selection of the annotation locator 720, the user interface may present the text box 722 to the user to receive information regarding the damage. A virtual keyboard or other input 204 may also be presented to the user, in some embodiments.

Figure 7D:
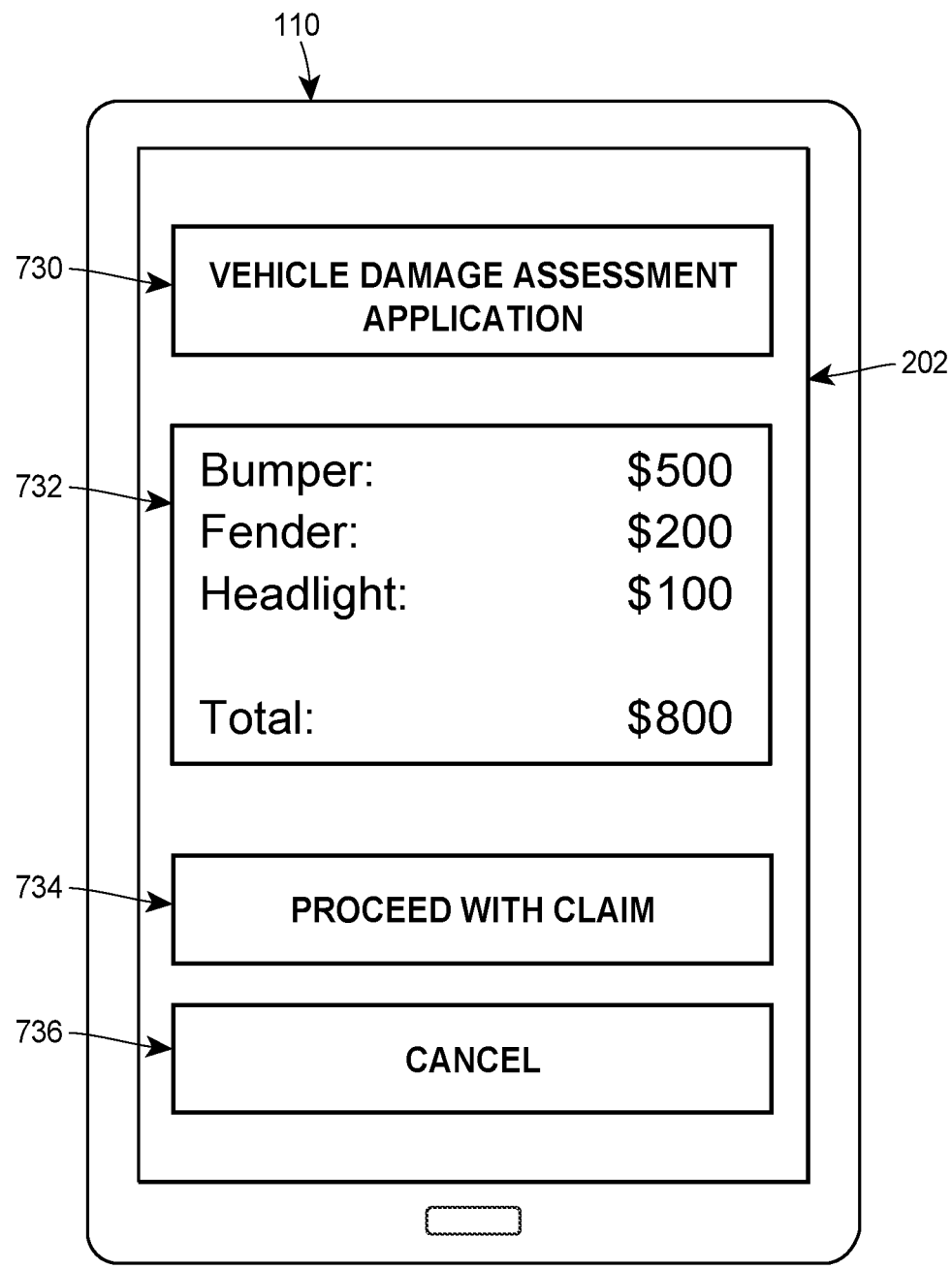
FIG. 7D illustrates an exemplary representation of a damage assessment user interface for presenting a damage estimate to the user based upon a virtual model of a vehicle.

FIG. 7D illustrates an exemplary representation of a damage assessment user interface for presenting a damage estimate to the user based upon a virtual model of the vehicle 310. Such a user interface may be used to present a damage estimate or related report to the user. The illustrated user interface includes a summary portion 730 indicating the general type of information being presented, a detail portion 732 indicating detailed damage estimates for damaged vehicle components, a confirmation option 734, and a rejection option 736. Upon selection of the confirmation option, the mobile computing device 110 may proceed with processing of an insurance claim based upon the presented damage estimate. Upon selection of the rejection option 736, the user may be presented with options to adjust or terminate the damage assessment processor. In some embodiments, the user may likewise be presented with options to rescan a portion of the vehicle 310 upon selection of the rejection option.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

As used herein, the term "vehicle" refers to any type of powered transportation device, which includes, but is not limited to, a car, truck, bus, motorcycle, plane, or boat—including fully or partially self-driving (i.e., autonomous or semi-autonomous) vehicles. While a vehicle may be described herein as being controlled by an operator or insured individual, the aspects described herein also apply to autonomous vehicles that may be unmanned and/or operated remotely or in another suitable fashion, such as via controls other than the steering wheel, gear shift, brake pedal, and accelerator pedal.

With the foregoing, an insurance customer may opt-in to a rewards, insurance discount, or other type of program. After the insurance customer provides their affirmative consent, an insurance provider remote server may collect data from the customer's mobile device, on-board vehicle computer, or other devices—such as with the customer's permission or affirmative consent. The data collected may be related to vehicle functionality (or vehicle occupant preferences or preference profiles) or vehicle operation, and/or insured assets before (and/or after) an insurance-related event, including those events discussed elsewhere herein. In return, risk-averse insureds, vehicle owners, or vehicle occupants may receive discounts or insurance cost savings related to auto insurance, as well as home, renters, personal articles, and other types of insurance from the insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method, comprising:
   identifying, using an existing first virtual model in which a physical object is represented, a configuration of a surface of the object;
   causing a computing device to capture first data points associated with the surface of the object, for which additional information is needed;

generating, based at least in part on the first data points, a second virtual model in which at least a portion of the object including the surface is represented;
identifying, based at least in part on the first data points and using the second virtual model, an area of the surface for which additional data is needed;
causing the computing device to capture second data points associated with the area of the surface;
updating the second virtual model based on the second data points;
determining, based on the representations of the surface in the first virtual model and in the second virtual model, an abnormality associated with the second virtual model; and
determining, based on the abnormality, a damaged section of the object, the damaged section including the surface.

2. The computer-implemented method of claim 1, further comprising:
generating a quality metric indicating an accuracy of the second virtual model;
determining that the quality metric satisfies a quality threshold;
determining, based at least in part on the quality metric satisfying the quality threshold, that capture of data points is complete; and
presenting, via a display of the computing device, information indicating the completion.

3. The computer-implemented method of claim 1, further comprising:
presenting, via a display of the computing device, a prompt associated with the damaged section,
wherein the prompt is indicative of the damaged section to be recaptured or an annotation to be entered.

4. The computer-implemented method of claim 3, further comprising:
receiving, from the computing device, an annotation in response to the prompt;
identifying, based on the annotation and the abnormality, a component of the object associated with the damaged section; and
determining, a damage estimate based at least in part on the annotation and the identified component.

5. The computer-implemented method of claim 1, further comprising:
presenting, via a display of the computing device and based at least in part on the damaged section, a plurality of scanning options for recapturing the damaged section,
wherein the scanning options include two or three-dimensional scanning, and a wavelength band in which to scan.

6. The computer-implemented method of claim 5, wherein the wavelength band in which to scan is selected based at least in part on a color of the damaged section.

7. The computer-implemented method of claim 1, wherein the object is a vehicle, and the damaged section is determined based at least in part on telematics data captured by sensors associated with the vehicle.

8. The computer-implemented method of claim 1, further comprising:
identifying, based at least in part on the second virtual model, a surface of the object to be recaptured;
generating instructions to capture third data points associated with the surface; and
updating the second virtual model based on the third data points.

9. The computer-implemented method of claim 8, wherein generating the instructions to capture the third data points comprises at least one of:
generating a visual indication of the surface to be recaptured;
generating an indication of a viewing angle from which the third data points are to be captured;
generating an indication of a distance from which the third data points are to be captured; or
generating a movement sequence for capturing the third data.

10. The computer-implemented method of claim 8, wherein the first data points are captured at a first resolution, and the third data points are captured at a second resolution higher than the first resolution.

11. The computer-implemented method of claim 8, wherein the object is a vehicle, and identifying the surface to be recaptured further comprises:
receiving telematics data captured by sensors associated with the vehicle;
determining, based at least in part on the telematics data, a likelihood that the surface is damaged; and
identifying the surface to be recaptured based on the likelihood exceeding a threshold value.

12. A system, comprising:
a processor;
a sensor communicatively connected to the processor; and
a non-transitory memory communicatively coupled to the processor and storing executable instructions that, when executed by the processor, cause system to:
identify, using an existing first virtual model representing a physical object, a configuration of a surface of the object;
cause the sensor to capture first data points associated with the surface of the object, for which additional information is needed;
generate, based on the first data points, a second virtual model representing at least a portion of the object including the surface;
identify, based at least in part on the first data points and using the second virtual model, an area of the surface for which additional data is needed;
cause the sensor to capture second data points associated with the area of the surface;
update the second virtual model based on the second data points;
determine, based on the representations of the surface in the first virtual model and in the second virtual model, an abnormality associated with the second virtual model; and
determining, based on the abnormality, a damaged section of the object, the damaged section including the surface.

13. The system of claim 12, further comprising a display communicatively connected to the processor, wherein the instructions further cause the processor to:
generate instructions indicating position of the sensor to capture the second data points; and
present, via the display, a visual representation of the second virtual model together with the instructions.

14. The system of claim 13, wherein the sensor comprises a camera of a mobile computing device, the mobile computing device including the display and the non-transitory memory.

15. The system of claim 12, wherein the instructions, when executed, further cause the system to:

determine, based on a difference between the representation of the surface in the first virtual model and the second virtual model, a likelihood that the surface is damaged; and determine, based at least in part of the likelihood exceeding a threshold value, a damage estimate corresponding to a component of the object associated with the surface.

16. The system of claim 12, wherein the sensor is a first sensor configured to capture radiation in a first wavelength band, and the system further comprises a second sensor configured to capture radiation in a second wavelength band different from the first wavelength band, and wherein the instructions, when executed, further cause the system to:
identify, based at least in part on the second virtual model, a section of the object to be recaptured;
cause the second sensor to capture third data points associated with the section; and
update the second virtual model based on the third data points.

17. A tangible, non-transitory computer-readable medium storing instructions that, when executed by a processor of a system, cause the processor to:
identify, using an existing first virtual model in which a physical object is represented, a configuration of a surface of the object;
cause a sensor of a computing device to capture first data points associated with the surface of the object, for which additional information is needed;
generate, based at least in part on the first data points, a second virtual model in which at least a portion of the object including the surface is represented;
identify, based at least in part on the first data points and using the second virtual model, an area of the surface for which additional data is needed;
cause the sensor of the computing device to capture second data points associated with the area of the surface;
update the second virtual model based on the second data points;

determine, based on the representations of the surface in the first virtual model and in the second virtual model, an abnormality associated with the second virtual model; and determining, based on the abnormality, a damaged section of the object, the damaged section including the surface.

18. The non-transitory computer-readable medium of claim 17, wherein the instructions, when executed, further cause the processor to:
generate a quality metric indicating an accuracy of the representation of the surface in the second virtual model;
based on the quality metric being less than a quality threshold, cause the sensor to capture third data points associated with the surface; and
update the second virtual model based on the third data points.

19. The non-transitory computer-readable medium of claim 17, wherein the instructions, when executed, further cause the processor to:
receive an annotation associated with the surface within the second virtual model;
identify, based on the annotation and a location of the surface, a component of the object; and
determine, based on a comparison between the first virtual model and the second virtual model, a damage estimate corresponding to the component.

20. The computer-implemented method of claim 1, wherein at least one of the first data points or the second data points are captured in a first wavelength band, the method further comprising:
identifying, based at least in part on the second virtual model, a section of the object to be recaptured;
causing the computing device to capture third data points associated with the section, wherein the third data points are captured in a second wavelength band different from the first wavelength band; and
updating the second virtual model based on the third data points.

* * * * *